United States Patent
Sayama et al.

(10) Patent No.: US 11,967,769 B2
(45) Date of Patent: Apr. 23, 2024

(54) PLANAR ANTENNA, LAYERED ANTENNA STRUCTURE, AND WINDOW GLASS FOR VEHICLE

(71) Applicant: AGC Inc., Tokyo (JP)

(72) Inventors: Toshiki Sayama, Tokyo (JP); Ryota Okuda, Tokyo (JP); Minami Hagiwara, Tokyo (JP); Yusuke Sato, Tokyo (JP); Takeshi Motegi, Tokyo (JP)

(73) Assignee: AGC INC., Tokyo (JP)

( * ) Notice: Subject to any disclaimer, the term of this patent is extended or adjusted under 35 U.S.C. 154(b) by 272 days.

(21) Appl. No.: 17/519,435

(22) Filed: Nov. 4, 2021

(65) Prior Publication Data

US 2022/0059948 A1    Feb. 24, 2022

Related U.S. Application Data

(63) Continuation of application No. PCT/JP2020/019126, filed on May 13, 2020.

(30) Foreign Application Priority Data

May 16, 2019  (JP) ................................. 2019-093095
Jan. 23, 2020  (JP) ................................. 2020-008921

(51) Int. Cl.
*H01Q 21/06*      (2006.01)
*H01Q 1/12*       (2006.01)
(Continued)

(52) U.S. Cl.
CPC .......... *H01Q 21/065* (2013.01); *H01Q 5/371* (2015.01); *H01Q 9/0407* (2013.01); *H01Q 9/0421* (2013.01); *H01Q 1/1271* (2013.01)

(58) Field of Classification Search
USPC ......................................................... 343/702
See application file for complete search history.

(56) References Cited

U.S. PATENT DOCUMENTS 6,313,796 B1   11/2001  Potin et al.
7,112,640 B2    9/2006  Funaki et al.
(Continued)

FOREIGN PATENT DOCUMENTS

EP    3 477 766 A1    5/2019
JP    S63-275204 A   11/1988
(Continued)

OTHER PUBLICATIONS

B. Givot, J. Krupka, K. Lees, R. Clarke and G. Hill, "Accurate Measurements of Permittivity and Dielectric Loss Tangent of Low Loss Dielectrics at Frequency Range 100 MHz—20 GHz," 2006 International Conference on Microwaves, Radar & Wireless Communications, Krakow, Poland, 2006, pp. 232-235, doi: 10 (Year: 2006).*

(Continued)

*Primary Examiner* — Hoang V Nguyen
*Assistant Examiner* — Brandon Sean Woods
(74) *Attorney, Agent, or Firm* — Foley & Lardner LLP

(57) ABSTRACT

A planar antenna includes a dielectric layer including a first surface and a second surface on a side opposite from the first surface, an antenna conductor provided on the first surface, a ground conductor provided on the first surface or the second surface, or provided on both of the first surface and the second surface, and a transmission line including a signal line that is connected to the antenna conductor or provided in proximity to the antenna conductor, wherein a dielectric portion of the dielectric layer that is in contact with the signal line has a loss tangent of 0.007 or less at 28 GHz.

14 Claims, 22 Drawing Sheets

(51) Int. Cl.
*H01Q 5/371* (2015.01)
*H01Q 9/04* (2006.01)

(56) References Cited

U.S. PATENT DOCUMENTS

| | | |
|---|---|---|
| 2008/0081139 A1 | 4/2008 | Iwahara et al. |
| 2013/0141289 A1* | 6/2013 | Vortmeier ............... H01Q 1/48 343/711 |
| 2014/0342155 A1 | 11/2014 | Abe et al. |
| 2017/0130009 A1 | 5/2017 | Hosoda et al. |
| 2018/0233804 A1* | 8/2018 | Nakano ............... H01Q 1/1278 |

FOREIGN PATENT DOCUMENTS

| JP | H05-57911 U | 7/1993 | |
|---|---|---|---|
| JP | 2007-180648 A | 7/2007 | |
| JP | 2009-200851 A | 9/2009 | |
| JP | 4788333 B2 * | 10/2011 | ....... B32B 17/10036 |
| JP | 2013-534095 A | 8/2013 | |
| JP | 2016-015679 A | 1/2016 | |
| JP | 2018-133667 A | 8/2018 | |
| WO | WO-2016/017801 A1 | 2/2016 | |
| WO | WO-2016/121397 A1 | 8/2016 | |
| WO | WO-2016121397 A1 * | 8/2016 | ............. B32B 15/08 |

OTHER PUBLICATIONS

International Searching Authority, "International Search Report," issued in connection with International Patent Application No. PCT/JP2020/019126, dated Aug. 11, 2020.

International Searching Authority, "Written Opinion," Issued in connection with International Patent Application No. PCT/JP2020/019126, dated Aug. 11, 2020.

* cited by examiner

PLANAR ANTENNA, LAYERED ANTENNA STRUCTURE, AND WINDOW GLASS FOR VEHICLE

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2020/019126 filed on May 13, 2020 and designating the U.S., which claims priority to Japanese Patent Application No. 2019-093095 filed on May 16, 2019 and Japanese Patent Application No. 2020-008921 filed on Jan. 23, 2020. The entirety of the foregoing applications is incorporated herein by reference.

BACKGROUND OF THE INVENTION

1. Field of the Invention

The present invention relates to a planar antenna, a layered antenna structure, and a window glass for vehicle.

2. Description of the Related Art

It is known that antennas that transmit and receive various electromagnetic waves are provided on laminated glass and the like such as windshields for automobiles. In particular, a glass antenna for receiving electromagnetic waves a megahertz band is known, the glass including an antenna based on a thin resin sheet or a film-shaped sheet (for example, an antenna constituted by conductive wires in a mesh form) sealed in such laminated glass in order to reduce mechanical damage (for example, see PTL 1).

CITATION LIST

Patent Literature

PTL 1: Japanese Laid-Open Patent Publication No. 2007-180648
PTL 2: International Publication. No. 2016/017801

SUMMARY OF THE INVENTION

Technical Problem

In recent years, with the increase in communication capacity, antennas that send and receive electromagnetic waves in a gigahertz band have been developed. As such an antenna, a planar antenna having a transmission line configured to feed radio frequency power to an antenna conductor is known. However, in the frequency band exceeding 1 GHz, the transmission loss in the transmission line tends to increase, and as a result, there is a problem in that the antenna gain decreases.

Accordingly, the present disclosure provides a planar antenna, a layered antenna structure, and window glass for vehicle capable of reducing a decrease in the antenna gain.

Solution to Problem

An aspect of an embodiment of the present disclosure provides a planar antenna including a dielectric layer including a first surface and a second surface on a side opposite from the first surface, an antenna conductor provided on the first surface, a ground conductor provided on the first surface or the second surface, or provided on both of the first surface and the second surface, and a transmission line including a signal line that is connected to the antenna conductor or provided in proximity to the antenna conductor, wherein a dielectric portion of the dielectric layer that is in contact with the signal line has a loss tangent of 0.007 or less at 28 GHz. Furthermore, another aspect of an embodiment of the present disclosure provides a layered antenna structure including the planar antenna. Furthermore, still another aspect of an embodiment of the present disclosure provides windows glass for vehicle including the planar antenna.

Advantageous Effects of Invention

According to the technique of the present disclosure, a planar antenna, a layered antenna structure, and window glass for vehicle capable of reducing a decrease in the antenna gain can be provided.

DETAILED DESCRIPTION OF THE PREFERRED EMBODIMENTS

Hereinafter, an embodiment according to the present disclosure will be described with reference to the drawings. Deviations from directions such as a parallel direction, a perpendicular direction, a horizontal direction, a vertical direction, an upward-downward direction, and a left-right direction are tolerated to such an extent so as not to impair the effects of the present invention. Also, an X axis direction, a Y axis direction, and a Z axis direction represent a direction parallel with the X axis, a direction parallel with the Y axis, and a direction parallel with the Z axis, respectively. The X axis direction, the Y axis direction, and the Z axis direction are perpendicular to each other. An XY plane, a YZ plane, and a ZX plane represent an imaginary plane in parallel with the X axis direction and the Y axis direction, an imaginary plane in parallel with the Y axis direction and the Z axis direction, an imaginary plane in parallel with the Z axis direction and the X axis direction, respectively.

A planar antenna according to an embodiment of the present disclosure is suitable for transmitting and receiving electromagnetic waves of radio frequency bands such as microwave and millimeter waves (for example, over 1 GHz to 300 GHz). The planar antenna according to the embodiment of the present disclosure can be applied to, for example, V2X communication system, fifth generation mobile communication system (what is termed as "5G"), automotive radar system, and the like, but is not limited thereto.

Figure 1:
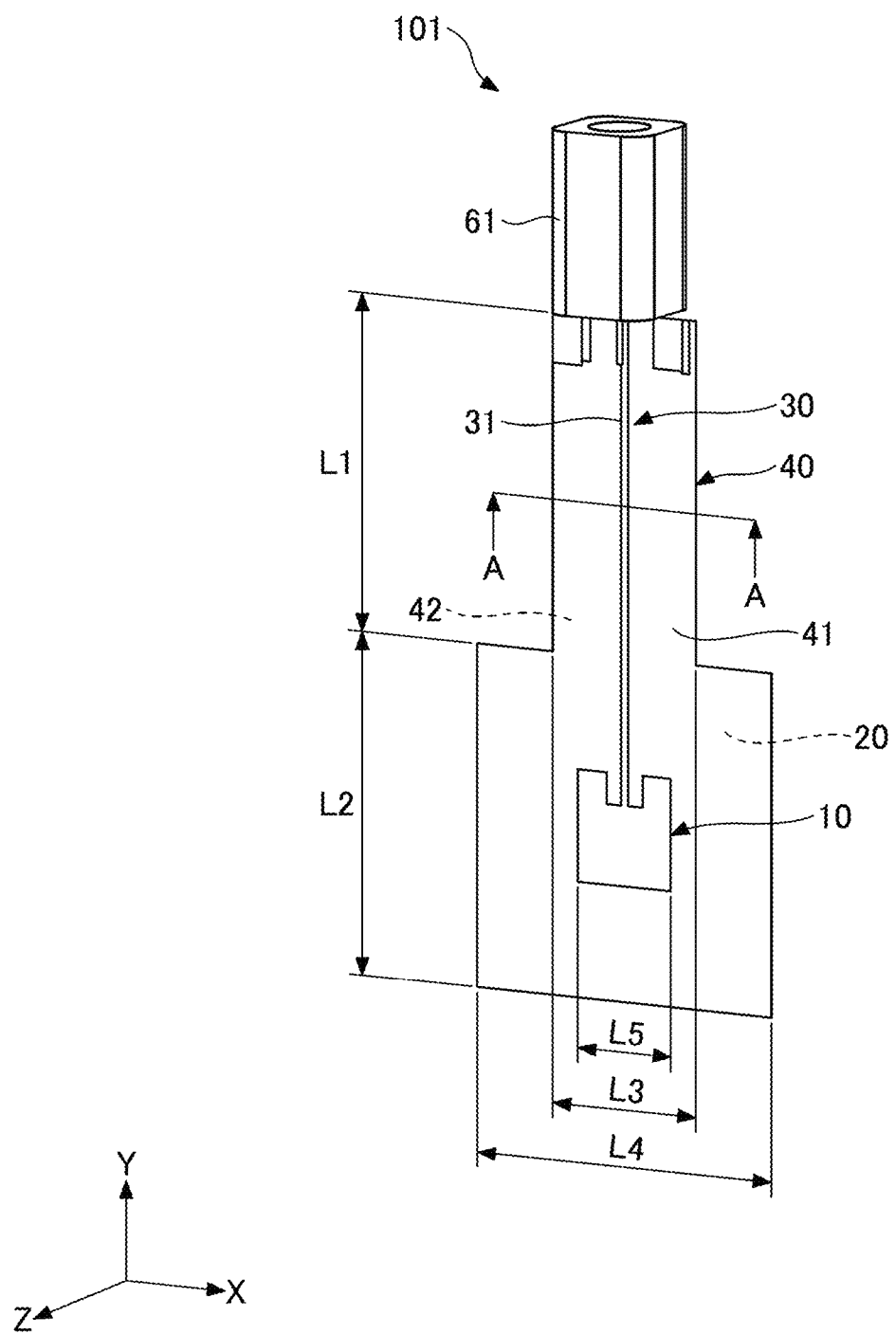
FIG. 1 is a perspective view illustrating a planar antenna according to a first configuration example.

FIG. 1 is a perspective view illustrating a planar antenna 101 according to a first configuration example. The planar antenna 101 as illustrated in FIG. 1 includes a dielectric layer 40 mainly constituted by a dielectric, an antenna conductor 10 provided on one of the surfaces of the dielectric layer 40, a ground conductor 20 on the opposite side of the dielectric layer 40 from the antenna conductor 10, and a transmission line 30 configured to feed radio frequency power to the antenna conductor 10. The planar antenna 101 is referred to as a patch antenna or a microstrip antenna. Throughout the present specification, a phrase "feed radio frequency power" is assumed to include the meanings of not only providing radio frequency power to the antenna conductor (for transmission) but also receiving radio frequency power from the antenna conductor (for reception).

Figure 2:
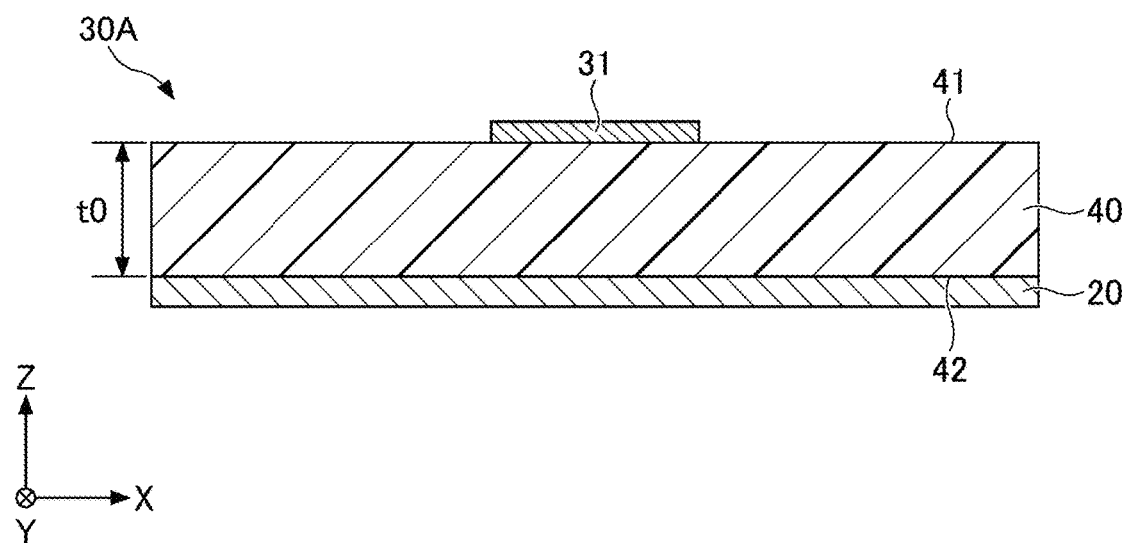
FIG. 2 is a cross sectional view illustrating a transmission line according to a first configuration example.

FIG. 2 is a cross sectional view illustrating a transmission line 30A according to a first configuration example taken along line A-A of FIG. 1. The transmission line 30A illustrated in FIG. 2 is an example of the transmission line 30 (see FIG. 1). The transmission line 30A is a microstrip line having a signal line 31 connected to the antenna conductor 10. In the form as illustrated in FIG. 2, the dielectric layer 40 is constituted by only a single layer.

The dielectric layer 40 includes a first main surface 41 and a second main surface 42 on the opposite side from the first main surface 41. The antenna conductor 10 and the signal line 31 are provided on the first main surface 41 of the dielectric layer 40. The ground conductor 20 is provided on the second main surface 42 of the dielectric layer 40. The antenna conductor 10 and the signal line 31 are on the opposite side of the dielectric layer 40 from the ground conductor 20. The first main surface 41 is an example of a first surface. The second main surface 42 is an example of a second surface.

The dielectric layer 40 is a plate-shaped or sheet-shaped base member mainly constituted by a dielectric. Both of the first main surface 41 and the second main surface 42 are parallel to the XY plane. The dielectric layer 40 may be, for example, a dielectric substrate or a dielectric sheet.

A dielectric portion (which may be hereinafter also referred to as a dielectric portion P) of the dielectric layer 40 that is in contact with the signal line 31 has a loss tangent (what is termed as tan δ) of 0.007 or less at 28 GHz. When the loss tangent of the dielectric portion P at 28 GHz is 0.007 or less, the transmission loss of the transmission line 30A is alleviated, and accordingly, a reduction of the antenna gain of the planar antenna 101 can be alleviated. In order to alleviate the transmission loss of the transmission line (and also to alleviate the reduction in the antenna gain), the dielectric portion P is preferably 0.006 or less, more preferably 0.005 or less, still more preferably 0.004 or less, still more preferably 0.003 or less, still more preferably 0.002 or less, and particularly more preferably 0.001 or less. The loss tangent of the dielectric portion P at 28 GHz may be 0 or more, and for example, it may be 0.00001 or more, may be 0.0005 or more, and may be 0.001 or more.

The loss tangent (tan δ) is a value measured using a cavity resonator and a vector network analyzer by the method specified in Japanese Industrial Standards (JIS R 1641: 2007) at 25° C., 28 GHz.

In the form as illustrated in FIG. 2, the dielectric portion P may be the entirety of the dielectric layer 40, or may be a portion of the dielectric layer 40. When the dielectric portion P is the entirety of the dielectric layer 40, the transmission loss can be reduced over the entirety of the signal line 31, which is preferable. Also, for example, when the entirety of the dielectric layer 40 is made of a "resin F" that is tetrafluoroethylene-based polymer explained later, an arithmetic average roughness Ra (JIS B 0601:2013 (corresponding international standard ISO 4287:1997, Amd. 1:2009)) of the first main surface 41 and the second main surface 42 can be reduced to 1.0 μm or less. Therefore, as the signal line 31 or the ground conductor 20, for example, a foil film made of copper of a low particle size (including a mesh) can be pasted to the first main surface 41 or the second main surface 42. In this manner, a foil film made of copper (a copper film) of a low particle size can be used for at least one of the signal line 31 and the ground conductor 20 in the transmission line 30A, and therefore, as compared with a copper film of a high particle size, the transmission loss of the transmission line can be alleviated more greatly, and the antenna gain can be improved.

The dielectric layer 40 is in contact with a portion or the entirety of the signal line 31. By the dielectric layer 40 being in contact with the entirety of the signal line 31, as compared with a form in which the dielectric layer 40 is in contact with a portion of the signal line 31, the loss tangent of the dielectric portion P at 28 GHz decreases to alleviate a reduction of the antenna gain, which is preferable.

Examples of the dielectric layer 40 include glass such as quartz glass, ceramics, resin, and the like. A flexible resin that can be bent when the planar antenna 101 is enclosed in the laminated glass for vehicle or when the planar antenna 101 is installed along a dielectric in a shape of a curved surface (a curved surface body) as explained later can be preferably used as the material of the dielectric layer 40.

In a case where the dielectric layer 40 includes a resin layer (i.e., in a case where a portion or the entirety of the dielectric layer 40 is a resin layer), examples of resins that can be contained in the resin layer include fluorine resins such as tetrafluoroethylene-based polymer, liquid crystal polymer, cycloolefin polymer, polyethylene terephthalate, urethane resin, silicone resins, polyimide resins, and the like. In particular, in a case where the resin layer contains tetrafluoroethylene-based polymer, the loss tangent of the dielectric portion P at 28 GHz is small, and therefore, a reduction of the antenna gain is alleviated, which is preferable.

When the dielectric portion P is formed by a resin layer (in particular, a resin layer containing tetrafluoroethylene-based polymer), the loss tangent of the dielectric portion P at 28 GHz significantly decreases, which is preferable in terms of alleviation of the reduction in the antenna gain. It should be noted that the loss tangent at 28 GHz is an example of an index in the frequency in the GHz band. Therefore, when the loss tangent at 28 GHz is 0.007 or less and is preferably 0.006 or less, for example, the transmission loss of the transmission line 30A even in 1 GHz to 100 GHz is alleviated, and therefore, the antenna gain of the planar antenna 101 can be improved in 1 GHz to 100 GHz, not only at around 28 GHz.

Preferable specific examples of tetrafluoroethylene-based polymer include a copolymer including TFE (tetrafluoroethylene), PPVE ($CF_2$=CFO $(CF_2)_3F$), and NAH (nadic anhydride). For example, the fluorine-containing copolymer has a copolymerization composition with a unit based on TFE/a unit based on PPVE/a unit based on NAH being 97.9/2.0/0.1 (mol %), a melting point of 300° C., and an MFR (melt flow rate) of 17.6 g/10 minutes. The loss tangent of the tetrafluoroethylene-based polymer at 28 GHz with such physical property values is about 0.001.

The dielectric layer 40 is preferably a transparent dielectric member that transmits visible light. In this case, "transparent" includes semi-transparent. In order to alleviate the obstruction of the field of view through the planar antenna, for example, the visible light transmittance of the dielectric layer 40 is preferably 30% or more, more preferably 40% or more, still more preferably 50% or more, still yet more preferably 60% or more, and particularly more preferably 80% or more. The upper limit is not particularly limited, but may be 99% or less, and may be 95% or less. In this case, the visible light transmittance is a value obtained by multiplying the values of the spectral transmittances measured by a spectrophotometer by weighting factors defined by the Japanese Industrial Standards (JIS R3106(1998)) and averaging the values to derive a weighted average.

In the form as illustrated in FIG. 1, the surface of the antenna conductor 10 is a conductor pattern parallel to the XY plane. The antenna conductor 10 is a conductor pattern formed on the first main surface 41 and may be formed by a conductor sheet or a conductor substrate provided on the first main surface 41. Examples of materials of conductors used for the antenna conductor 10 include gold, silver, copper, aluminum, platinum, chromium, and the like, but are not limited to these.

The antenna conductor 10 includes, for example, at least one patch conductor. In the form as illustrated in FIG. 1, the antenna conductor 10 is illustrated as an example having a single patch conductor.

The antenna conductor 10 is preferably formed in a mesh form in order to increase the light transmission. In this case, the mesh means a state in which through holes in a mesh form are formed in the antenna conductor 10.

In a case where the antenna conductor 10 is formed in a mesh form, the holes of the mesh may be in a quadrilateral shape or in a rhombic shape. When the holes of the mesh are formed in a quadrilateral shape, the holes of the mesh are preferably in a square shape. In a case where the holes of the mesh are in a square shape, the design can be improved. In addition, the holes of the mesh may have a random shape formed by the self-organizing method, which can alleviate moire. The line width of the mesh is preferably 1 to 30 μm and more preferably 6 to 15 μm. The line interval of the mesh is preferably 50 to 500 μm and more preferably 100 to 300 μm.

The aperture ratio of the antenna conductor is preferably 80% or more and more preferably 90% or more. The aperture ratio is a ratio of an area of aperture portions to a certain unit area of the antenna conductor 10 including the aperture portions. The visible light transmittance of the antenna conductor 10 can be increased in accordance with an increase in the aperture ratio of the antenna conductor 10.

The antenna conductor 10 may be a solid pattern constituted by an area in which the degree of transparency of visible light is lower than the dielectric layer 40. For example, the entirety of the antenna conductor 10 may be constituted by an opaque planar conductor.

In order to increase the visible light transmittance, the thickness of the antenna conductor 10 is preferably 400 nm or less and more preferably 300 nm or less. The lower limit of the thickness of the antenna conductor 10 is not particularly limited, but may be 2 nm or more, may be 10 nm or more, or may be 30 nm or more in order to improve the performance of the antenna. The thickness of the antenna conductor 10 is not limited to the above-described ranges if it is not necessary to increase the visible light transmittance, and may be set, as appropriately, to a value in a range in which radiation efficiency of the antenna conductor 10 can be increased.

In a case where the antenna conductor 10 is formed in a mesh form, the thickness of the antenna conductor 10 may be 1 to 40 μm. In a case where the antenna conductor 10 is formed in a mesh form, the visible light transmittance can be increased even when the antenna conductor 10 is thick. The thickness of the antenna conductor 10 is more preferably 5 μm or more and still more preferably 8 μm or more. The thickness of the antenna conductor 10 is more preferably 30 μm or less, still more preferably 20 μm or less, and particularly more preferably 15 μm or less.

In the form as illustrated in FIGS. 1 and 2, the signal line 31 is a strip line of a microstrip line, and the surface of the signal line 31 is a conductor pattern parallel to the XY plane. The signal line 31 is a conductor pattern formed on the first main surface 41, and may be formed by a conductor sheet or a conductor substrate provided on the first main surface 41. Although copper is mentioned as the material of the conductor used for the signal line 31, in addition, gold, silver, platinum, aluminum, chrome, and the like can be used, but the material is not limited thereto. In the form as illustrated in FIG. 1, the signal line 31 is formed integrally with the antenna conductor 10.

The signal line 31 includes a first end connected to the antenna conductor 10 and a second end, i.e., a feeding end, connected to an external device, not illustrated, such as an amplifier. In the form as illustrated in FIG. 1, the second end is provided with a connector 61 for connecting to the external device, not illustrated. The signal line 31 is a strip conductor extending in the Y axis direction.

When it is desired to increase the optical transparency, the signal line 31 is preferably formed in a mesh form. In this case, the mesh means a state in which through holes in a mesh form are formed in the signal line 31. In a case where the signal line 31 is formed in a mesh form, it is effective to make the signal line 31 less visible when the signal line 31 is formed in the transparent dielectric.

In a case where the signal line 31 is formed in a mesh form, the holes of the mesh may be in a quadrilateral shape or in a rhombic shape. When the holes of the mesh are formed in a quadrilateral shape, the holes of the mesh are preferably in a square shape. In a case where the holes of the mesh are in a square shape, the design can be improved. The holes of the mesh may have a random shape formed by the self-organizing method, which can alleviate moire. The line width of the mesh is preferably 1 to 30 µm and more preferably 6 to 15 µm. The line interval of the mesh is preferably 50 to 500 µm and more preferably 100 to 300 µm.

The aperture ratio of the signal line 31 is preferably 80% or more and more preferably 90% or more. The aperture ratio is a ratio of an area of aperture portions to a certain unit area of the signal line 31 including the aperture portions. The visible light transmittance of the signal line 31 can be increased in accordance with an increase in the aperture ratio of the signal line 31.

The signal line 31 may be a solid pattern constituted by an area in which the degree of transparency of visible light is lower than the dielectric layer 40. For example, a portion or the entirety of the signal line 31 may be constituted by an opaque planar conductor. For example, in a case where the planar antenna 101 is attached to glass for vehicle (a windshield or the like) provided with a light-shielding film such as black ceramics or the like in the peripheral area, and the signal line 31 and the light-shielding film are arranged to overlap with each other in a plan view, the decrease in the visibility can be alleviated even if the signal line 31 is formed solidly. In this case, since the signal line 31 is solidly formed, the reduction in the transmission loss can be alleviated. Similarly, in a case where the ground conductor 20 explained later has an arrangement of overlapping with the light-shielding film, the overlapping portion is not limited to a mesh form but may be formed solidly. In this manner, when at least a portion of the signal line 31 and the ground conductor 20 is formed solidly, not only the electric stability is obtained but also snapping of a mesh line of a mesh, when it is bent, is less likely to occur, which is preferable.

The surface of the ground conductor 20 is a conductor pattern parallel to the XY plane. The ground conductor 20 is a conductor pattern formed on the second main surface 42, and may be formed by a conductor sheet or a conductor substrate provided on the second main surface 42. Copper has been mentioned as the material of the conductor used for the ground conductor 20. In addition, gold, silver, platinum, aluminum, chrome, and the like can be used, but the material is not limited thereto.

When it is desired to increase the optical transparency, the ground conductor 20 is preferably formed in a mesh form. In this case, the mesh means a state in which through holes in a mesh form are formed in the ground conductor 20. In a case where the ground conductor 20 is formed in a mesh form, it is effective make the ground conductor 20 less visible when the ground conductor 20 is formed in the transparent dielectric.

In a case where the ground conductor 20 is formed in a mesh form, the holes of the mesh may be in a quadrilateral shape or in a rhombic shape. When the holes of the mesh are formed in a quadrilateral shape, the holes of the mesh are preferably in a square shape. In a case where the holes of the mesh are in a square shape, the design can be improved. The holes of the mesh may have a random shape formed by the self-organizing method, which can alleviate moire. The line width of the mesh is preferably 1 to 30 µm and more preferably 6 to 15 µm. The line interval of the mesh is preferably 50 to 500 µm and more preferably 100 to 300 µm.

The aperture ratio of the ground conductor 20 is preferably 80% or more and more preferably 90% or more. The aperture ratio is a ratio of an area of aperture portions to a certain unit area of the ground conductor 20 including the aperture portions. The visible light transmittance of the ground conductor 20 can be increased in accordance with an increase in the aperture ratio of the ground conductor 20.

The ground conductor 20 may be a solid pattern constituted by an area in which the degree of transparency of visible light is lower than the dielectric layer 40. For example, a portion or the entirety of the ground conductor 20 may be constituted by an opaque planar conductor.

The thickness of the ground conductor 20 is preferably 0.09 µm or more and more preferably 0.35 µm or more. Also, the thickness of the ground conductor 20 is 110 µm or less. When the thickness of the ground conductor 20 is in the above range, the antenna gain of the antenna conductor 10 can be improved.

When the ground conductor 20 is formed in a mesh form, the thickness of the ground conductor 20 is preferably 0.3 µm or more, more preferably 1 µm or more, still more preferably 2 µm or more, particularly more preferably 5 µm or more, and most preferably 10 µm or more. Also, in a case where the ground conductor 20 is formed in a mesh form, the thickness of the ground conductor 20 is preferably 40 µm or less, more preferably 30 µm or less, and still more preferably 20 µm or less. When the ground conductor 20 is formed in a mesh form, the visible light transmittance can be increased even if the ground conductor 20 is thick.

The area of the main surface of the ground conductor 20 is preferably larger than the area of the main surface of the antenna conductor 10. When the area of the main surface of the ground conductor 20 is larger than the area of the main surface of the antenna conductor 10, the electromagnetic shielding performance improves. The area of the main surface of the ground conductor 20 is preferably three or more times and more preferably four or more times the area of the main surface of the antenna conductor 10.

The planar antenna 101 may be attached to window glass such as of a building or a vehicle, and the window glass may be what is termed as a single plate constituted by a single piece of glass, or may be laminated glass. For example, a spacer is used to attach the planar antenna 101 to window glass. The material for forming the spacer is not particularly limited so long as it can be fixed to the contact surface of the planar antenna 101 and window glass. For example, the material for forming the spacer may be an adhesive, an elastic seal, or a metal. Known resins such as, for example, silicone-based resin, polysulfide-based resin, and acrylic-based resin can be used as the material for forming the adhesive and the elastic seal. The metal can be made of aluminum or the like.

When the planar antenna 101 is attached to glass of buildings such as office buildings and houses, the planar antenna 101 may be attached to the indoor-side or the outdoor-side, or may be attached to both of the indoor-side and the outdoor-side. In this manner in a case where the planar antenna 101 is attached to both of the indoor-side and the outdoor-side, the planar antenna 101 can also serve as equipment that functions as a relay station (a repeater) for electromagnetic waves including a predetermined frequency band (for example, 28 GHz).

The planar antenna 101 may be formed by using window glass as the dielectric layer 40 and providing the antenna conductor 10, the ground conductor 20, and the signal line 31 on the window glass. For example, with window glass for automobiles and buildings made of a glass material of which tan δ at 28 GHz is 0.007 or less and preferably 0.006 or less, the planar antenna 101 can be readily achieved by attaching the signal line 31, the antenna conductor 10, and the ground conductor 20 to the window glass.

Figure 3:
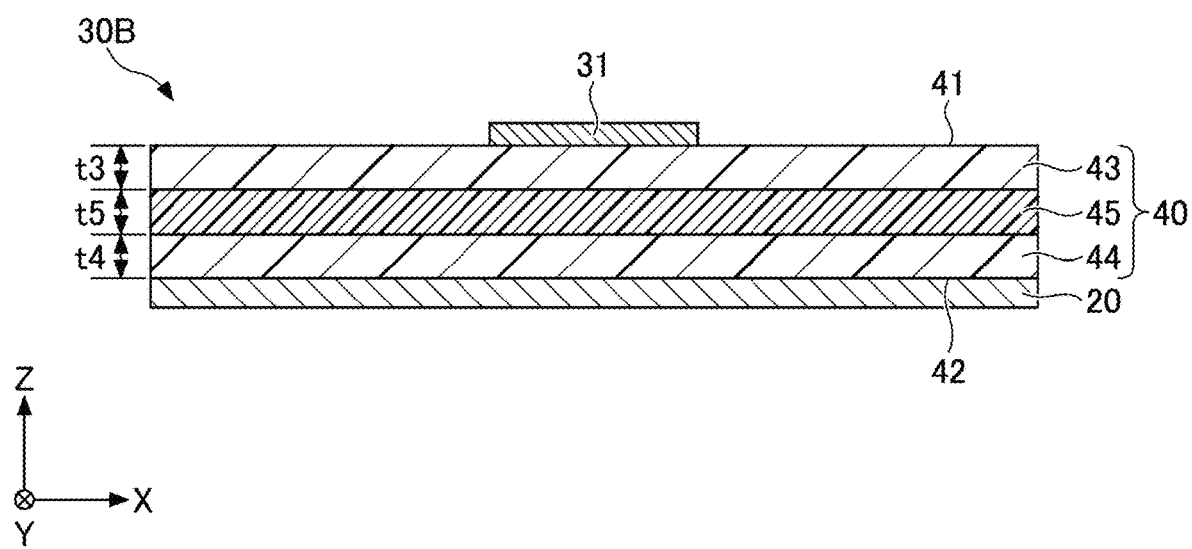
FIG. 3 is a cross sectional view illustrating a transmission line according to a second configuration example.

FIG. 3 is a cross-sectional view illustrating a transmission line 30B according to a second configuration example taken along a cross section A-A (see FIG. 1). Explanation about the configurations and effects similar to the above-described transmission line is omitted or abbreviated by incorporating the above explanation by reference. The transmission line 30B as illustrated in FIG. 3 is an example of the transmission line 30 (see FIG. 1). The transmission line 30B is a microstrip line including the signal line 31 connected to the antenna conductor 10. In the form as illustrated in FIG. 3, the dielectric layer 40 is formed by multiple layers.

In the form as illustrated in FIG. 3, the dielectric layer 40 includes a first resin layer 43 including the first main surface 41, a second resin layer 44 including the second main surface 42, and a third resin layer 45 provided between the first resin layer 43 and the second resin layer 44 in the thickness direction of the dielectric layer 40. The third resin layer 45 is made of a resin material that is different from the first resin layer 43 and the second resin layer 44. Because the third resin layer 45 is made of a material harder than the first resin layer 43 and the second resin layer 44, the rigidity of the planar antenna 101 is improved. When the third resin layer 45 has heat resistance (high glass transition temperature), high-temperature molding becomes possible in manufacturing. Further, even if the third resin layer 45 is made a resin of which tan δ at the 28 GHz is higher than tan δ of the first resin layer and the second resin layer, it is expected that the cost of the material can be reduced if it is a material of which the productivity is effective.

In the form as illustrated in FIG. 3, the dielectric portion P of the dielectric layer 40 that is in contact with the signal line 31 is the entirety or a portion of the first resin layer 43. Because the loss tangent of the dielectric portion P at 28 GHz is 0.007 or less and preferably 0.006 or less, the transmission loss of the transmission line 30B is reduced, and accordingly, a reduction in the antenna gain of the planar antenna 101 can be alleviated. A preferable range of the loss tangent of the first resin layer 43 and the second resin layer 44 at 28 GHz may be the same as in the first configuration example.

When the first resin layer 43 or the second resin layer 44 or both contain tetrafluoroethylene-based polymer, the loss tangent of the dielectric portion P at 28 GHz becomes low, which is preferable in order to alleviate a reduction of the antenna gain.

When the first resin layer 43 and the second resin layer 44 are made of the same resin material, the loss tangent of the dielectric portion P at 28 GHz significantly decreases, which is preferable in order to alleviate a reduction of the antenna gain. In particular, these layers preferably contain tetrafluoroethylene-based polymer.

The third resin layer 45 preferably contains at least one of polyimide-based resin, polyethylene-based resin, cycloolefin-based resin, polyester-based resin, epoxy-based resin, polycarbonate-based resin, liquid crystal polymer, or polyetheretherketone-based resin. An example of polyester-based resin includes polyethylene terephthalate. The loss tangent of the third resin layer 45 at 28 GHz is preferably small, and may be 0.010 or less, preferably 0.007 or less, more preferably 0.006 or less, more preferably 0.005 or less, still more preferably 0.003 or less, and particularly more preferably 0.001 or less.

In a case where the dielectric layer 40 is constituted by three layers, i.e., the first resin layer 43, the second resin layer 44, and the third resin layer 45, the first resin layer 43 and the second resin layer 44 are preferably materials of which the loss tangent at 28 GHz is 0.007 or less and preferably 0.006 or less, and are more particularly preferably tetrafluoroethylene-based polymer, but are not limited thereto. For example, the dielectric layer 40 may be constituted by four or more layers, so long as a material of which the loss tangent at 28 GHz is 0.007 or less and preferably a material of which the loss tangent at 28 GHz is 0.006 or less is contained. In a case where the dielectric layer 40 is constituted by three layers, any one of the first resin layer 43 to the third resin layer 45 may be a material of which the loss tangent at 28 GHz is 0.007 or less or preferably a material of which the loss tangent at 28 GHz is 0.006 or less. In this case, the third resin layer 45 may be a tetrafluoroethylene-based polymer, and each of the first resin layer 43 and the second resin layer 44 may contain at least one of polyimide-based resin, polyethylene-based resin, cycloolefin-based resin, polyester-based resin, epoxy-based resin, polycarbonate-based resin, liquid crystal polymer, or polyetheretherketone-based resin. In this configuration, the loss tangent at 28 GHz of the first resin layer 43 and the second resin layer 44 may be 0.010 or less, and is preferably 0.007 or less, more preferably 0.006 or less, more preferably 0.005 or less, still more preferably 0.003 or less, and more particularly preferably 0.001 or less.

The transmission line 30 as illustrated in FIG. 1 is a microstrip line, but the transmission line configured to feed radio frequency power to the antenna conductor 10 may be a transmission line other than the microstrip line. Other examples of transmission lines include a strip line, a coplanar wave guide, a conductor-backed coplanar wave guide (CBCPW), a substrate integrated waveguide (SIW), a post wall waveguide (PWW), a coplanar strip (CPS), a slot line, and the like.

Figure 4:
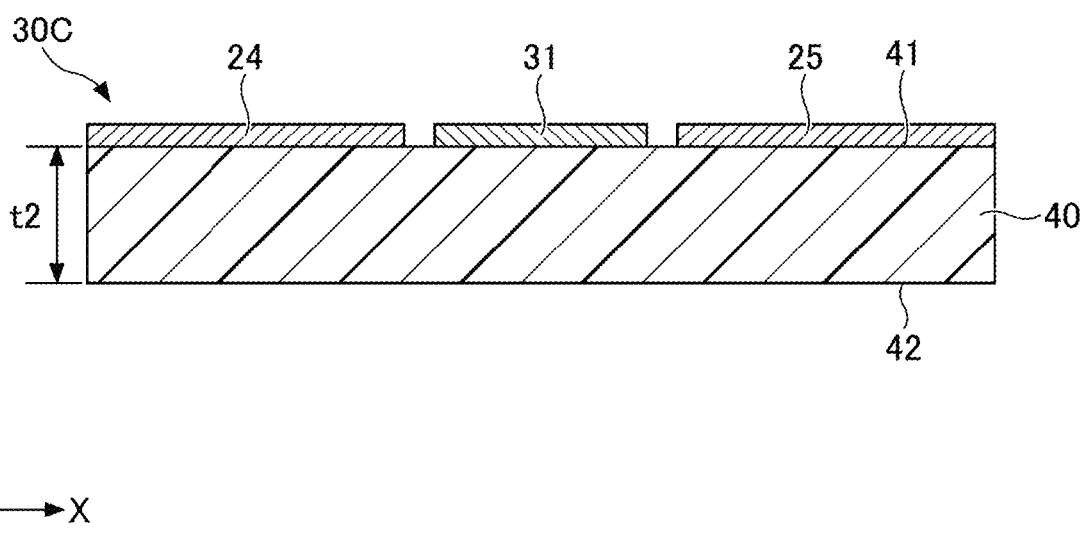
FIG. 4 is a cross sectional view illustrating a transmission line according to a third configuration example.

FIG. 4 is a drawing illustrating a transmission line 30C according to a third configuration example. Explanation about the configurations and effects similar to the above-described transmission line is omitted or abbreviated by incorporating the above explanation by reference. The transmission line 30C as illustrated in FIG. 4 is a coplanar wave guide having the signal line 31 connected to the antenna conductor 10. In the form as illustrated in FIG. 4, the dielectric layer 40 is constituted by a single layer, or may be constituted by three layers as in the second configuration example.

In the third configuration example, the antenna conductor 10, the signal line 31, and ground conductors 24 and 25 are provided on the first main surface 41 of the dielectric layer 40, and a ground conductor is not provided on the second main surface 42 of the dielectric layer 40. The transmission line 30C includes a first gap formed between the signal line 31 and the ground conductor 24 and a second gap between the signal line 31 and the ground conductor 25.

In the form as illustrated in FIG. 4, the dielectric portion P of the dielectric layer 40 that is in contact with the signal line 31 is the entirety or a portion of the dielectric layer 40. The loss tangent of the dielectric portion P at 28 GHz is 0.006 or less, so that the transmission loss of the transmission line 30C is alleviated, and accordingly, a reduction of the antenna gain of the planar antenna can be alleviated. A preferable range of the loss tangent of the dielectric layer 40 at 28 GHz may be the same as in the dielectric layer 40 of the first configuration example.

Figure 5:
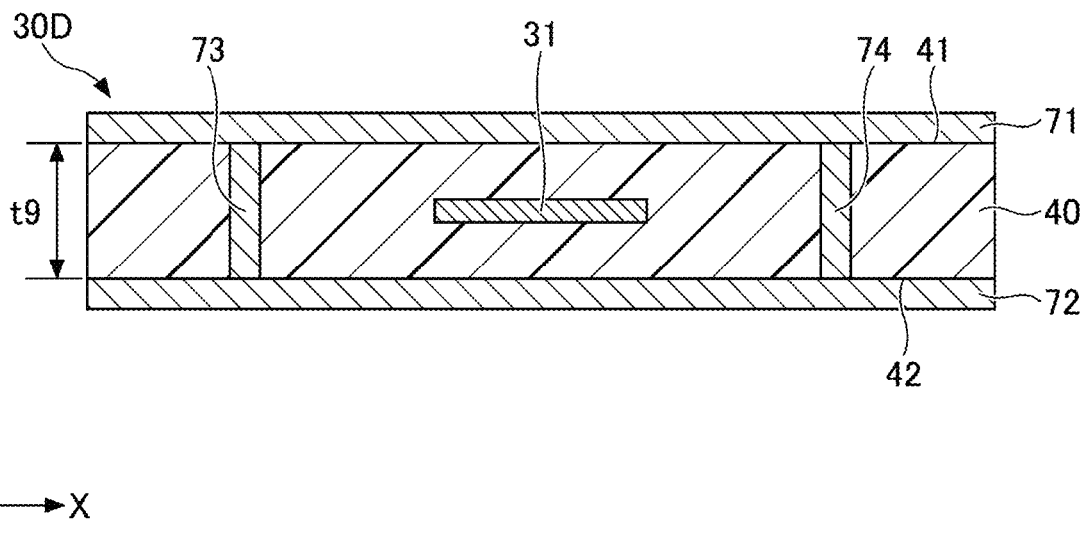
FIG. 5 is a cross sectional view illustrating a transmission line according to a fourth configuration example.

FIG. 5 is a drawing illustrating a transmission line 30D according to a fourth configuration example. Explanation about the configurations and effects similar to the above-described transmission line is omitted or abbreviated by incorporating the above explanation by reference. The transmission line 30D as illustrated in FIG. 5 is a strip line having the signal line 31 connected to the antenna conductor 10. In the form as illustrated in FIG. 5, the dielectric layer 40 is constituted by a single layer.

The transmission line 30D includes a ground conductor 71 formed on the first main surface 41, a ground conductor 72 formed on the second main surface 42, a dielectric layer 40 provided between the ground conductor 71 and the ground conductor 72, and a signal line 31 provided inside the dielectric layer 40. The transmission line 30D includes a first conductor wall 73 extending in the Y axis direction and a second conductor wall 74 extending in the Y axis direction, the first conductor wall 73 and the second conductor wall 74 being spaced apart in the X axis direction. The ground conductor 71 and the ground conductor 72 are connected via the first conductor wall 73 and the second conductor wall 74. For example, the first conductor wall 73 and the second conductor wall 74 are each formed such that multiple vias extending in the Z axis direction are arranged spaced apart by a predetermined distance along the Y axis direction.

In the form as illustrated in FIG. 5, the dielectric portion P of the dielectric layer 40 that is in contact with the signal line 31 is the entirety or a portion of the dielectric layer 40. The loss tangent of the dielectric portion P at 28 GHz is 0.007 or less and preferably 0.006 or less, so that the transmission loss of the transmission line 30D is alleviated, and accordingly, a reduction of the antenna gain of the planar antenna can be alleviated. A preferable range of the loss tangent of the dielectric layer 40 at 28 GHz may be the same as in the dielectric layer 40 of the first configuration example.

Figure 6:
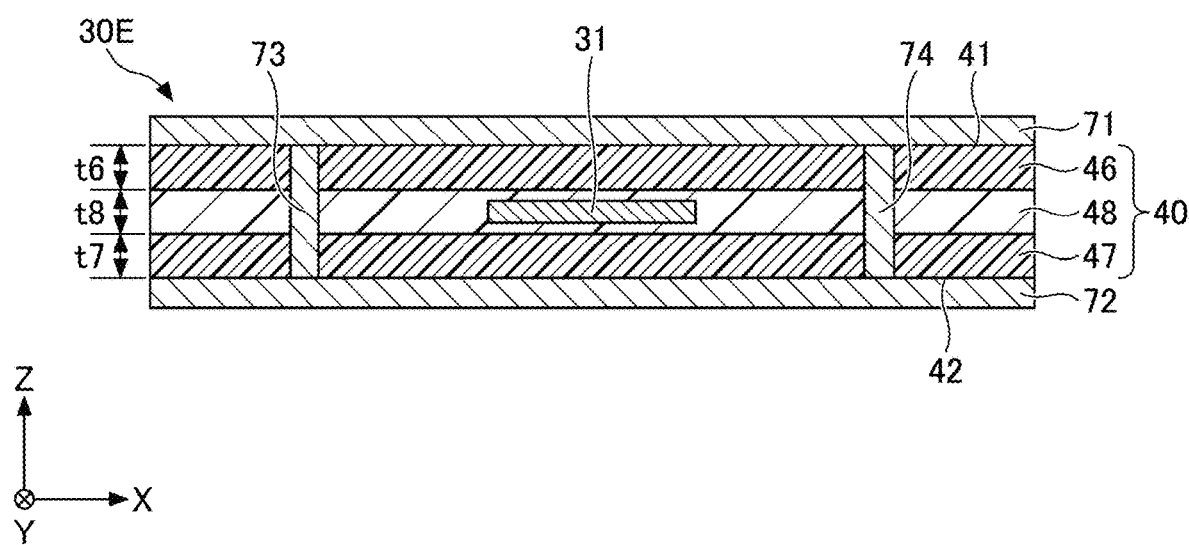
FIG. 6 is a cross sectional view illustrating a transmission line according to a fifth configuration example.

FIG. 6 is a drawing illustrating a transmission line 30E according to a fifth configuration example. Explanation about the configurations and effects similar to the above-described transmission line is omitted or abbreviated by incorporating the above explanation by reference. The transmission line 30E as illustrated in FIG. 6 is a strip line having the signal line 31 connected to the antenna conductor 10. In the form as illustrated in FIG. 6, the dielectric layer 40 is constituted by multiple layers.

In the form as illustrated in FIG. 6, the dielectric layer 40 includes a first resin layer 46 having the first main surface 41, a second resin layer 47 having the second main surface 42, and a third resin layer 48 provided between the first resin layer 46 and the second resin layer 47 in the thickness direction of the dielectric layer 40.

The transmission line 30E includes the ground conductor 71 formed on the first main surface 41, the ground conductor 72 formed on the second main surface 42, the dielectric layer 40 provided between the ground conductor 71 and the ground conductor 72, and the signal line 31 provided inside the third resin layer 48 in the dielectric layer 40.

The third resin layer 48 is made of a resin material that is different from the first resin layer 46 and the second resin layer 47. Even if the third resin layer 48 is made of a material softer than the first resin layer 46 and the second resin layer 47, a reduction of the rigidity of the planar antenna can be alleviated because the dielectric layer 40 is provided between the ground conductors 71 and 72.

In the form as illustrated in FIG. 6, the dielectric portion P of the dielectric layer 40 that is in contact with the signal line 31 is the entirety or a portion of the third resin layer 48. The loss tangent of the dielectric portion P at 28 GHz is 0.007 or less and preferably 0.006 or less, so that the transmission loss of the transmission line 30E is alleviated, and accordingly, a reduction of the antenna gain of the planar antenna can be alleviated. A preferable range of the loss tangent of the third resin layer 48 at 28 GHz may be the same as in the first configuration example.

Figure 7:
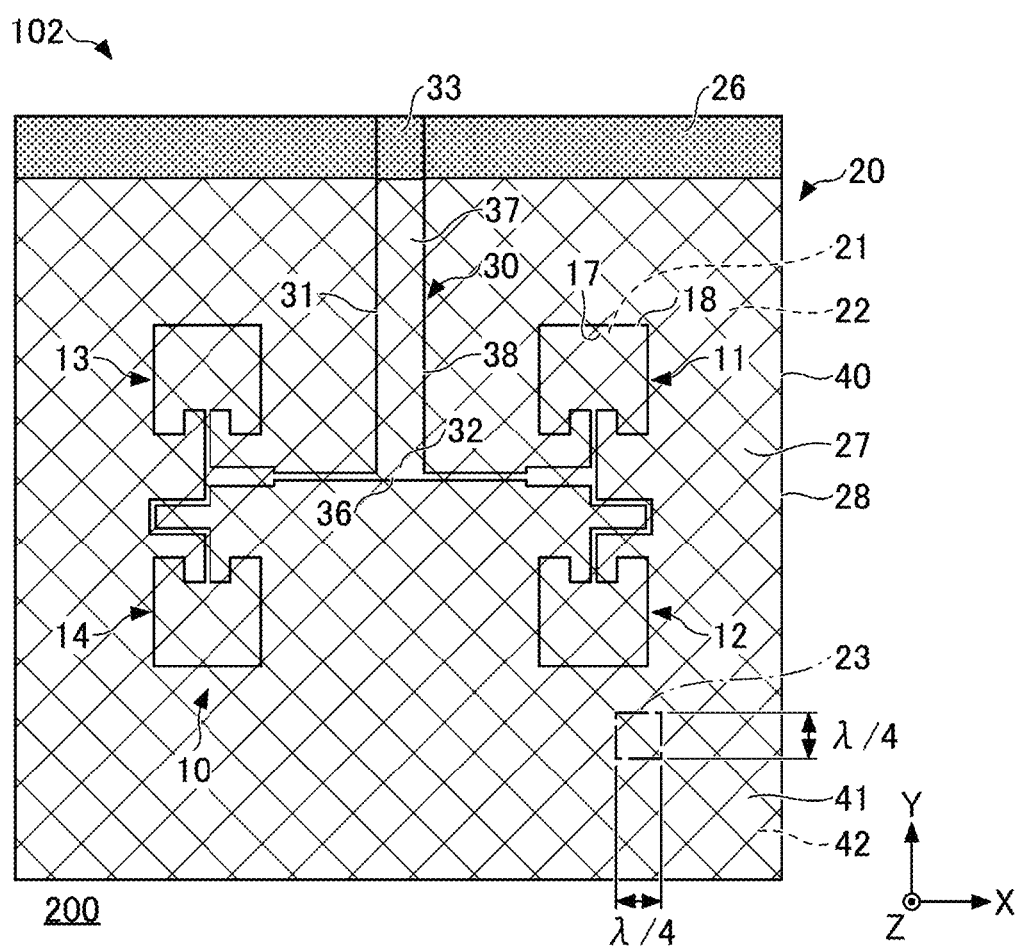
FIG. 7 is a plan view illustrating a planar antenna according to a second configuration example.

FIG. 7 is a plan view illustrating a planar antenna 102 according to a second configuration example. Explanation about the configurations and effects similar to the above-described planar antenna is omitted or abbreviated by incorporating the above explanation by reference. The planar antenna 102 as illustrated in FIG. 7 includes a dielectric layer 40 through which visible light passes, an antenna conductor 10 provided on one of the surfaces of the dielectric layer 40, a ground conductor 20 on the opposite side of the dielectric layer 40 from the antenna conductor 10, and a transmission line 30 configured to feed radio frequency power to the antenna conductor 10. The planar antenna 102 is referred to as a patch antenna or a microstrip antenna.

In the form as illustrated in FIG. 7, the antenna conductor 10 constitutes an array antenna including four patch conductors 11, 12, 13, and 14.

The antenna conductor 10 may be a solid pattern constituted by an area in which the degree of transparency of visible light is lower than the dielectric layer 40. For example, the entirety of the antenna conductor 10 may be constituted by an opaque planar conductor including multiple patch conductors 11 to 14.

The signal line 31 includes a first end 32 and a second end 33. The first end 32 is connected to a branch portion 36 connected to a branch path to patch conductors 11 and 12 and a branch path to patch conductors 13 and 14. The second end 33 is a feeding end connected to an external device, not illustrated, such as an amplifier and the like. In the planar antenna 102, the signal line 31 is a strip conductor extending in the Y axis direction, and the first end 32 is connected to the antenna conductor 10.

The ground conductor 20 includes line-shaped ground conductors 27 formed in such a manner as to make gaps and a planar ground conductor 26 connected to the line-shaped ground conductors 27. The planar ground conductor 26 is a ground portion provided in a belt-shape on one side of the second main surface 42. The planar ground conductor 26 is a ground electrode corresponding to the second end 33 that is the feeding end.

In the planar antenna 102, the line-shaped ground conductors 27 are formed in a mesh shape in such a manner as to make gaps, so that visibility (transparency) can be secured with the gaps. In the planar antenna 102, the gaps in a lattice shape are formed.

In the planar antenna 102, the ground conductor 20 includes an outer edge line-shaped conductor 28 that is in contact with the line-shaped ground conductors 27 and that forms the outer edge of the ground conductor 20. The outer edge line-shaped conductor 28 encloses the line-shaped ground conductors 27. Although the outer edge line-shaped conductor 28 may be arranged to enclose a portion of the line-shaped ground conductors 27, it is not necessary to provide the outer edge line-shaped conductor 28 at all. The above explanation about the arrangement and presence or absence of the outer edge line-shaped conductor 28 is also applicable to other forms of planar antennas.

As illustrated in FIG. 7, in the planar antenna 102, the ground conductor 20 is provided in the first area 21 that overlaps with the antenna conductor 10 and a second area 22 that does not overlap with the antenna conductor 10 in a plan view. More specifically, in the planar antenna 102, the line-shaped ground conductors 27 are provided in both of the first area 21 and the second area 22.

The second area 22 includes an area 23 in which a ratio of an area occupied by the ground conductor 20 to an area of $\lambda/4 \times \lambda/4$ (hereinafter also referred to as a ratio R) is 50% or less, where an effective wavelength, in the dielectric layer 40, of electromagnetic waves transmitted and received by the planar antenna 102 is denoted as A. For example, in the area 23, the ratio R of the line-shaped ground conductors 27 that blocks transmission of visible light is 50% or less. Because the second area 22 includes the above-described area 23, it is possible to provide the planar antenna 102 that can alleviate blocking of view and that has a high degree of directionality and a desired sensitivity for transmission and reception.

For example, in a case where the planar antenna 102 is provided on the surface or the inside of the window glass 200, the area 23 of which the ratio R is 50% or less can inhibit or prevent the planar antenna 102 (in particular, the ground conductor 20) from blocking the view through the window glass 200. The ratio R is preferably 40% or less and more preferably 30% or less. The lower limit of the ratio R is not particularly limited as long as it exceeds 0%, but in order to stably secure the antenna gain, for example, the ratio R may be 2% or more, and is preferably 5% or more. More preferably, the area 23 of which the ratio R is 50% or less is provided, and a ratio of an area occupied by the ground conductor 20 to the entire area of the second area 22 (hereinafter also referred to as a ratio R') is 50% or less. Similar to the ratio R, the ratio R' is also preferably 40% or less and more preferably 30% or less. The lower limit of the ratio R' is not particularly limited as long as it exceeds 0%, but in order to stably secure the antenna gain, for example, the ratio R' may be 2% or more, and is preferably 5% or more.

When the ratio R exceeds 50%, it is difficult to secure the view. When the ratio R becomes, for example, less than 2%, the view can be readily secured, but it is difficult to secure the antenna gain. When the ratio R' exceeds 50%, it is difficult to secure the view. When the ratio R' becomes, for example, less than 2%, the view can be readily secured, but it may be difficult to secure the antenna gain.

The antenna conductor 10 includes internal line-shaped conductors 17 formed in such a manner as to make gaps inside the antenna conductor 10. In the planar antenna 102, the internal line-shaped conductors 17 are formed in a mesh shape in such a manner as to make gaps formed in the lattice shape. At least a portion of the internal line-shaped conductors 17 overlaps with the line-shaped ground conductors 27 of the ground conductor 20 in a plan view. Preferably, the entirety of the internal line-shaped conductors 17 overlaps with the line-shaped ground conductors 27. In this manner, both of the antenna conductor 10 and the ground conductor 20 are formed by line-shaped conductors in such a manner as to make gaps, which makes it easier to secure the view.

In the planar antenna 102, the antenna conductor 10 includes an outer edge line-shaped conductor 18 that is in contact with the internal line-shaped conductors 17 and that forms the outer edge of the antenna conductor 10. The outer edge line-shaped conductor 18 is in the closed state enclosing the internal line-shaped conductors 17. In this manner, in the antenna conductor 10, the outer edge line-shaped conductor 18 is configured to enclose the internal line-shaped conductors 17, so that a difference from the current distribution obtained in the case of an opaque planar conductor can be alleviated, and preferable antenna characteristics can be secured.

The signal line 31 includes internal line-shaped conductors 37 formed in such a manner as to make gaps inside the signal line 31. In the planar antenna 102, the internal line-shaped conductors 37 are formed in a mesh shape in such a manner as to make gaps formed in the lattice shape. At least a portion of the internal line-shaped conductors 37 overlaps with the line-shaped ground conductors 27 of the ground conductor 20 in a plan view. Preferably, the entirety of the internal line-shaped conductors 37 overlaps with the line-shaped ground conductors 27. In this manner, both of the signal line 31 and the ground conductor 20 are formed by line-shaped conductors formed in such a manner as to make gaps, which makes it still easier to secure the view.

In the planar antenna 102, the signal line 31 includes an outer edge line-shaped conductor 38 that is in contact with the internal line-shaped conductors 37 and that forms the outer edge of the signal line 31. The outer edge line-shaped conductor 38 is in the closed state enclosing the internal line-shaped conductors 37. In this manner, the signal line 31 is configured so that the outer edge line-shaped conductor 38 encloses the internal line-shaped conductors 37, so that a difference from the current distribution obtained in the case of an opaque planar conductor can be alleviated, and preferable antenna characteristics can be secured.

In the form as illustrated in FIG. 7, the dielectric portion P of the dielectric layer 40 that is in contact with the signal line 31 is the entirety or a portion of the dielectric layer 40. The loss tangent of the dielectric portion P at 28 GHz is 0.007 or less and preferably 0.006 or less, so that the transmission loss of the transmission line 30 is alleviated, and accordingly, a reduction of the antenna gain of the planar antenna 102 can be alleviated. A preferable range of the loss tangent of the dielectric layer 40 at 28 GHz may be the same as in the dielectric layer 40 of the first configuration example.

Figure 8:
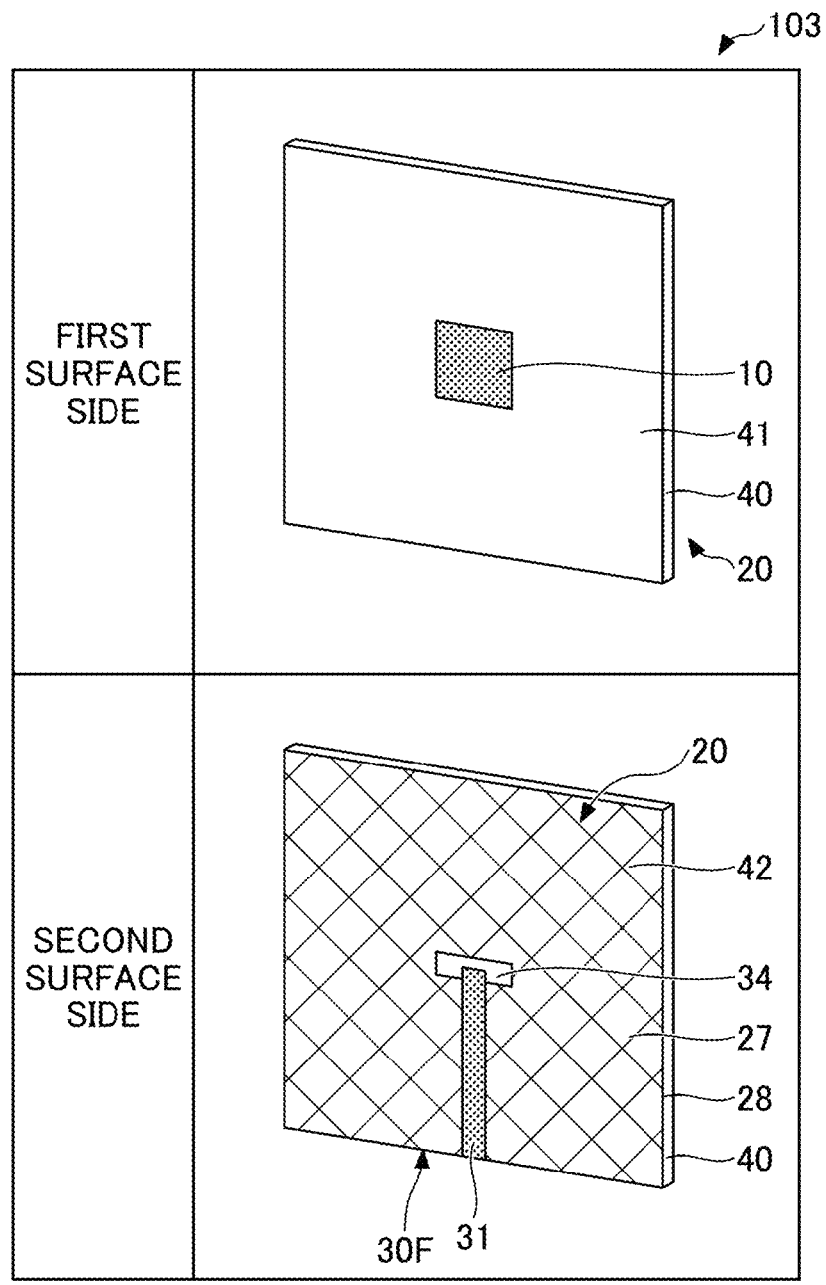
FIG. 8 is a drawing illustrating a planar antenna according to a third configuration example.

FIG. 8 is a perspective view illustrating a planar antenna 103 according to a third configuration example in which a transmission line configured to feed radio frequency power to the antenna conductor 10 is constituted by a coplanar wave guide. Explanation about the configurations and effects similar to the above-described planar antenna is omitted or abbreviated by incorporating the above explanation by reference. The planar antenna 103 as illustrated in FIG. 8 includes a dielectric layer 40 through which visible light passes, an antenna conductor 10 provided on one of the surfaces of the dielectric layer 40, a ground conductor 20 on the opposite side of the dielectric layer 40 from the antenna conductor 10, and a transmission line 30F configured to feed radio frequency power to the antenna conductor 10 through a slot 34. In other words, the transmission line 30F is a coplanar wave guide having a signal line 31 in proximity to the antenna conductor 10.

In FIG. 8, the signal line 31 and the ground conductor 20 are formed on the second main surface 42 of the dielectric layer 40 (the surface on the opposite side from the first main surface 41 on which the antenna conductor 10 is formed). The transmission line 30F includes a pair of gaps extending in parallel and a signal line 31 (which is also referred to as a central conductor in this case) provided between the pair of gaps. The slot 34 formed at the end of the transmission line 30F and the antenna conductor 10 formed on the first main surface 41 are coupled in terms of radio frequency. The slot 34 is a gap formed in the ground conductor 20.

In the form as illustrated in FIG. 8, the ground conductor 20 includes line-shaped ground conductors 27 formed in such a manner as to make gaps, and the line-shaped ground conductors 27 are formed in a mesh shape in such a manner as to make gaps, so that visibility (transparency) can be secured with the gaps. The signal line 31 or the antenna conductor 10 or both may have line-shaped conductors formed in such a manner as to make gaps. Accordingly, further transparency can be secured.

In the form as illustrated in FIG. 8, the dielectric portion P of the dielectric layer 40 that is in contact with the signal line 31 is the entirety or a portion of the dielectric layer 40. The loss tangent of the dielectric portion P at 28 GHz is 0.007 or less and preferably 0.006 or less, so that the transmission loss of the transmission line 30F can alleviated, and accordingly, a reduction of the antenna gain of the planar antenna 103 can be alleviated. A preferable range of the loss tangent of the dielectric layer 40 at 28 GHz may be the same as in the dielectric layer 40 of the first configuration example.

Figure 9:
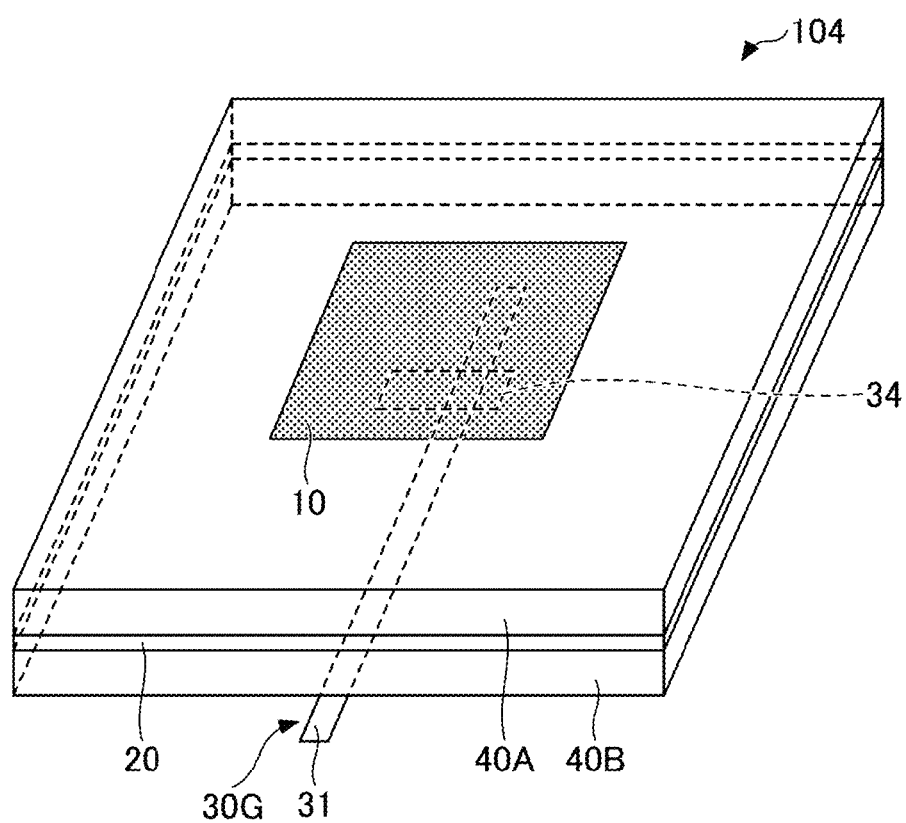
FIG. 9 is a drawing illustrating a planar antenna according to a fourth configuration example.

FIG. 9 is a perspective view illustrating a planar antenna 104 according to a fourth configuration example in which a transmission line configured to feed radio frequency power to the antenna conductor 10 is constituted by a microstrip line. Explanation about the configurations and effects similar to the above-described planar antenna is omitted or abbreviated by incorporating the above explanation by reference. The planar antenna 104 as illustrated in FIG. 9 includes dielectric layers 40A, 40B through which visible light passes, an antenna conductor 10 provided on one of the surfaces of the dielectric layer 40A, a ground conductor 20 on the opposite side of the dielectric layer 40A from the antenna conductor 10, and a transmission line 30G configured to feed radio frequency power to the antenna conductor 10 through a slot 34. In other words, the transmission line 30G is a microstrip line having a signal line 31 in proximity to the antenna conductor 10.

In FIG. 9, the ground conductor 20 is provided between the pair of dielectric layers 40A, 40B. The antenna conductor 10 is a patch conductor formed on the surface of the first dielectric layer 40A. The signal line 31 is a strip conductor formed on the surface of the second dielectric layer 40B. Via the slot 34 formed in the ground conductor 20, the antenna conductor 10 and the transmission line 30G are electromagnetically coupled, so that radio frequency power is fed to the antenna conductor 10 to excite the antenna conductor 10. The slot 34 intersects the signal line 31 in a plan view.

The ground conductor 20 as illustrated in FIG. 9 preferably includes line-shaped ground conductors formed in such a manner as to make gaps. Visibility (transparency) can be secured with the gaps. The signal line 31 or the antenna conductor 10 or both may have line-shaped conductors formed in such a manner as to make gaps. This can furthermore secure transparency.

In the form as illustrated in FIG. 9, the dielectric portion P of the dielectric layer 40B that is in contact with the signal line 31 is the entirety or a portion of the dielectric layer 40B. The loss tangent of the dielectric portion P at 28 GHz is 0.007 or less and preferably 0.006 or less, so that the transmission loss of the transmission line 30G is alleviated, and accordingly, a reduction of the antenna gain of the planar antenna 104 can be alleviated. A preferable range of the loss tangent of the dielectric layer 40B at 28 GHz may be the same as in the dielectric layer 40 of the first configuration example. Also, a preferable range of the loss tangent of the dielectric layer 40A at 28 GHz may be the same as in the dielectric layer 40 of the first configuration example.

Figure 10:
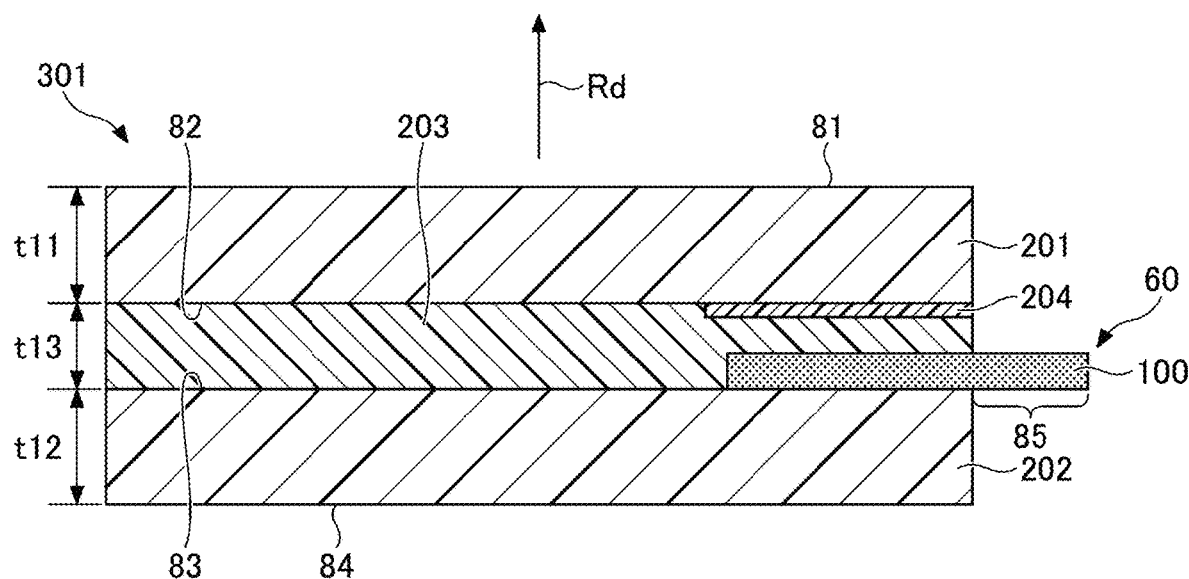
FIG. 10 is a cross sectional view illustrating a layered antenna structure according to a first configuration example.

FIG. 10 is a cross sectional view illustrating a layered antenna structure 301 according to a first configuration example. As illustrated in FIG. 10, the layered antenna structure 301 includes a planar antenna 100, a glass plate 201 serving as a dielectric layer, a glass plate 202 serving as a dielectric layer, and an interlayer 203. Each of the glass plate 201 and the glass plate 202 is an example of a dielectric layer, and a resin material may be used for the glass plate 201 or the glass plate 202 or for both. Examples of resin materials include acrylic resin, polyethylene phthalate, polyvinyl chloride, polystyrene, cycloolefin polymer, fluorine resin such as tetrafluoroethylene-based polymer, polycarbonate resin, and the like. The above can also be applied to layered antenna structures illustrated in FIG. 11A, FIG. 11B, FIG. 11C, and the like explained later. Hereinafter, an aspect in which the dielectric layer is the glass plate 201 and the glass plate 202 is explained. The glass plate 201 may also be referred to as a first glass plate, and the glass plate 202 may also be referred to as a second glass plate.

The planar antenna 100 is a planar antenna according to an embodiment of the present disclosure, and corresponds to, for example, the above-described planar antenna 101 and the like. The glass plate 201 includes a first glass surface and a second glass surface 82 on the opposite side from the first glass surface 81. The glass plate 202 includes a third glass surface 83 on the opposite side from the glass plate 201 and a fourth glass surface 84 on the opposite side from the third glass surface 83. The glass plate 202 is an example of a dielectric. The third glass surface 83 is an example of a third surface. The fourth glass surface 84 is an example of a fourth surface. The interlayer 203 bonds the glass plate 201 and the glass plate 202. In other words, the layered antenna structure 301 is laminated glass with the planar antenna 100. The planar antenna 100 radiates electromagnetic waves to the outside of the glass plate 201 in the radiation direction Rd.

A thickness t11 of the glass plate 201 can be determined as appropriately depending on the purpose of the layered antenna structure 301, and can be adjusted in a range of, for example, 0.2 mm to 20 mm. For example, in a case where the layered antenna structure 301 is applied to window glass for automobiles (for example, windshields and the like), the thickness t11 of the glass plate 201 is preferably 1.1 mm or more, more preferably 1.5 mm or more, and still more preferably 1.8 mm or more, in order to secure the strength, especially to increase the resistance against stone chip, which is an index of the strength. In the case where the layered antenna structure 301 is applied to window glass for automobiles (for example, windshields and the like), the upper limit of the thickness t11 is not particularly limited, but when the glass plate becomes thicker, the weight increases, and therefore, usually, the upper limit of the thickness t11 is preferably 3.0 mm or less. In a case where the layered antenna structure 301 is used as window glass for railroad vehicles and the like, it is necessary to secure a higher degree of strength, and therefore, for example, the upper limit of the thickness t11 is preferably 5 mm or more and more preferably 8 mm or more. In the case where the layered antenna structure 301 is used as window glass for railroad vehicles and the like, likewise, the upper limit of the thickness t11 is not particularly limited, but when the glass plate becomes thicker, the weight increases, and therefore, usually, the upper limit of the thickness t11 is preferably 15 mm or less. A thickness t12 of the glass plate 202 can be determined as appropriately depending on the purpose of the layered antenna structure 301, and can be adjusted in a range of, for example, 0.2 mm to 15 mm. For example, in a case where the layered antenna structure 301 is applied to window glass for automobiles (for example, windshields and the like), the thickness t12 of the glass plate 202 is preferably 0.3 mm or more, more preferably 0.5 mm or more, and still more preferably 1.0 mm or more, in view of handling. In the case where the layered antenna structure 301 is applied to window glass for automobiles (for example, windshields and the like), the thickness t12 of the glass plate 202 is preferably 2.3 mm or less and more preferably 2.0 mm or less, in order to reduce the weight. In a case where the layered antenna structure 301 is used as window glass for railroad vehicles and the like, it is necessary to secure a higher degree of strength, and therefore, for example, the thickness t12 of the glass plate 202 is preferably 3 mm or more and more preferably 5 mm or more. In the case where the layered antenna structure 301 is used as window glass for railroad vehicles and the like, likewise, the upper limit of the thickness t12 is not particularly limited, but when the glass plate becomes thicker, the weight increases, and therefore, usually, the upper limit of the thickness t12 is preferably 10 mm or less.

In the layered antenna structure 301, at least a portion of the planar antenna 100 is interposed, via the interlayer 203, between the glass plate 201 and the glass plate 202. Specifically, in the layered antenna structure 301, at least a portion of the planar antenna 100 is interposed between a first interface and a second interface, the first interface being an interface between the glass plate 201 and the interlayer 203, the second interface being an interface between the interlayer 203 and the glass plate 202. At least a portion of the planar antenna 100 is interposed via the interlayer 203, so that at least a portion of the planar antenna 100 can be sealed while it is fixed in the layered antenna structure 301. When the layered antenna structure 301 is used as window glass for vehicle, the planar antenna 100 is less likely to be directly exposed to wind and ultraviolet rays as compared with the form in which the planar antenna 100 is exposed, and therefore, degradation of the antenna conductor, the ground conductor, and the dielectric layer can be prevented, and the layered antenna structure 301 is advantageous in improvement of weather resistance and reduction of wind noise.

In the form as illustrated in FIG. 10, the planar antenna 100 is in contact with the third glass surface 83 without the interlayer 203 being interposed between the planar antenna 100 and the third glass surface 83 of the glass plate 202, while the planar antenna 100 faces the second glass surface 82 with a portion of the interlayer 203 interposed between the planar antenna 100 and the second glass surface 82 of the glass plate 201.

Alternatively, the planar antenna 100 may be in contact with the second glass surface 82 without the interlayer 203 being interposed between the planar antenna 100 and the second glass surface 82 of the glass plate 201, while the planar antenna 100 may face the third glass surface 83 with a portion of the interlayer 203 interposed between the planar antenna 100 and the third glass surface 83 of the glass plate 202.

The planar antenna 100 may include a protruding portion 85 extending to the outside of the glass plate 201, and the at least one feeding portion 60 configured to feed radio frequency power to the antenna conductor 10 via the transmission line may be provided on the protruding portion 85. In this case, because the feeding portion 60 is provided on the protruding portion 85, the feeding portion 60 can be readily connected to an external apparatus such as an amplifier. When, of the planar antenna 100, the dielectric layer 40 of at least the protruding portion 85 is a resin layer of which the loss tangent at 28 GHz is 0.007 or less and preferably 0.006 or less, then, the transmission loss of the signal line 31 can be reduced, the protruding portion 85 can be folded more easily (i.e., flexibility can be improved), and a connection with an external device can be readily made. A preferable range of the loss tangent of the dielectric layer 40 of the protruding portion 85 at 28 GHz may be the same as in the dielectric layer 40 of the first configuration example.

As described above, the layered antenna structure 301 preferably includes a light-shielding film 204 that overlaps with at least a portion of the antenna conductor 10 in a plan view of the glass plate 201. Therefore, when the layered antenna structure 301 is seen from the side of the first glass surface 81, at least a portion of the antenna conductor 10 is hidden by the light-shielding film 204, which improves the design. In FIG. 10, the light-shielding film 204 is provided on the second glass surface 82, but instead of being provided on the second glass surface 82, the light-shielding film 204 may be provided on the fourth glass surface 84. Further, the light-shielding film 204 is provided on at least one or more surfaces from among the first glass surface 81, the second glass surface 82, the third glass surface 83, and the fourth glass surface 84. The light-shielding film 204 is provided as needed. For example, in a case where the planar antenna 100 has a certain level of transparency and is less likely to be seen, the light-shielding film 204 does not have to be provided depending on the purpose.

Figure 11A:
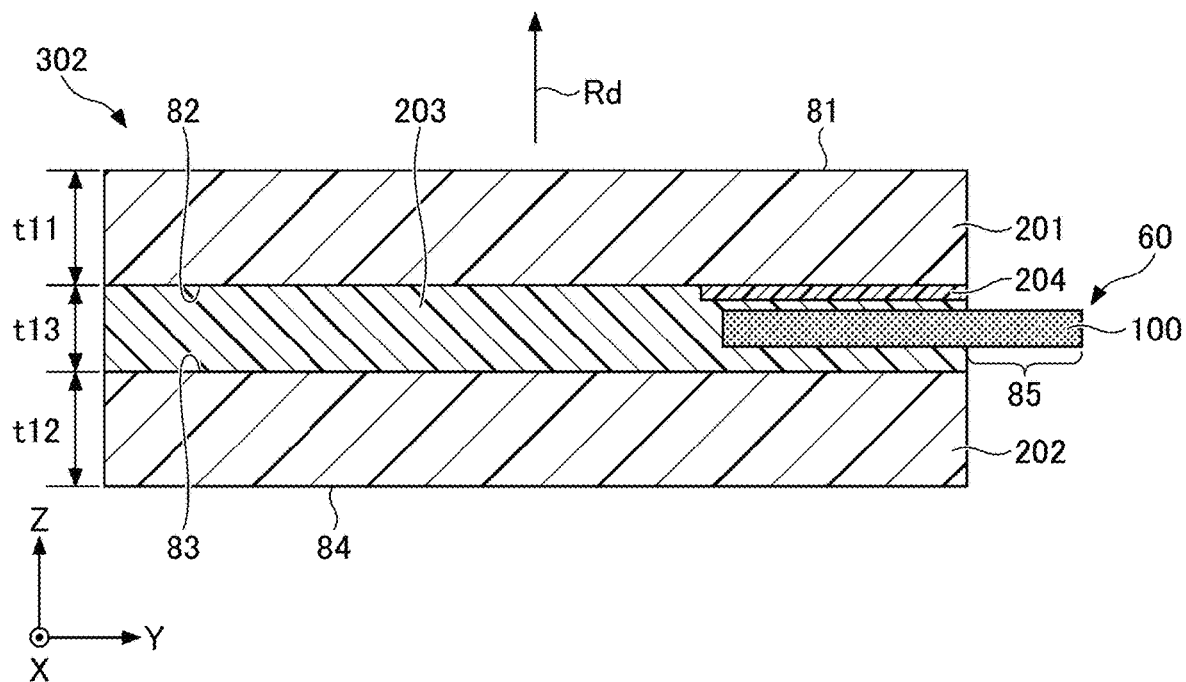
FIG. 11A is a cross sectional view illustrating a layered antenna structure according to a second configuration example.

FIG. 11A is a cross sectional view illustrating a layered antenna structure 302 according to a second configuration example. Explanation about the configurations and effects similar to the above-described layered antenna structure is omitted or abbreviated by incorporating the above explanation by reference. The layered antenna structure 302 as illustrated in FIG. 11A includes a planar antenna 100, a glass plate 201, a glass plate 202, and an interlayer 203. The interlayer 203 may be made of polyvinyl butyral (PVB), ethylene vinyl acetate copolymer (EVA), cycloolefin polymer (COP), and the like.

In the form as illustrated in FIG. 11A, the planar antenna 100 is located inside the interlayer 203 so as not to come into contact with the glass plate 201 and the glass plate 202. The planar antenna 100 faces the second glass surface 82 with a portion of the interlayer 203 interposed between the planar antenna 100 and the second glass surface 82 of the glass plate 201, and faces the third glass surface 83 with a portion of the interlayer 203 interposed between the planar antenna 100 and the third glass surface 83 of the glass plate 202. The interlayer 203 may be constituted by multiple interlayers. For example, the layered antenna structure 302 as illustrated in FIG. 11A includes two layers, i.e., a first portion interlayer and a second portion interlayer (not illustrated), serving as the interlayer 203, and includes the planar antenna 100 between these two layers. The layered antenna structure 302 may be made by, for example, laminating the glass plate 201, the interlayer 203 including (a portion of) the planar antenna 100, and the glass plate 202 in this order and heating and pressurizing the laminate in an autoclave. Note that when the first portion interlayer and the second portion interlayer are made of the same material, the first portion interlayer and the second portion interlayer have the same linear thermal expansion coefficient, and therefore, distortion and cracking can be alleviated, which is preferable.

The planar antenna 100 is located inside the interlayer 203 so that the planar antenna 100 is along the surface of the glass plate 201 on the side of the interlayer 203 (i.e., the second glass surface 82). When the thickness of the interlayer 203 is defined as 100%, the planar antenna 100 is preferably located in a range of 5% to 95% of the thickness of the interlayer 203. When the planar antenna 100 is located in such a range, a portion of the interlayer 203 interposed between the planar antenna 100 and the glass plate functions as a matching layer, which is advantageous in improving the antenna gain of the planar antenna 100. In the form as illustrated in FIG. 10, there is a contact portion between the planar antenna 100 and the glass plate 202, while in the form as illustrated in FIG. 11A, such a contact portion is not provided, and therefore, mechanical damage that occurs at the contact portion is likely to be alleviated.

Figure 11B:
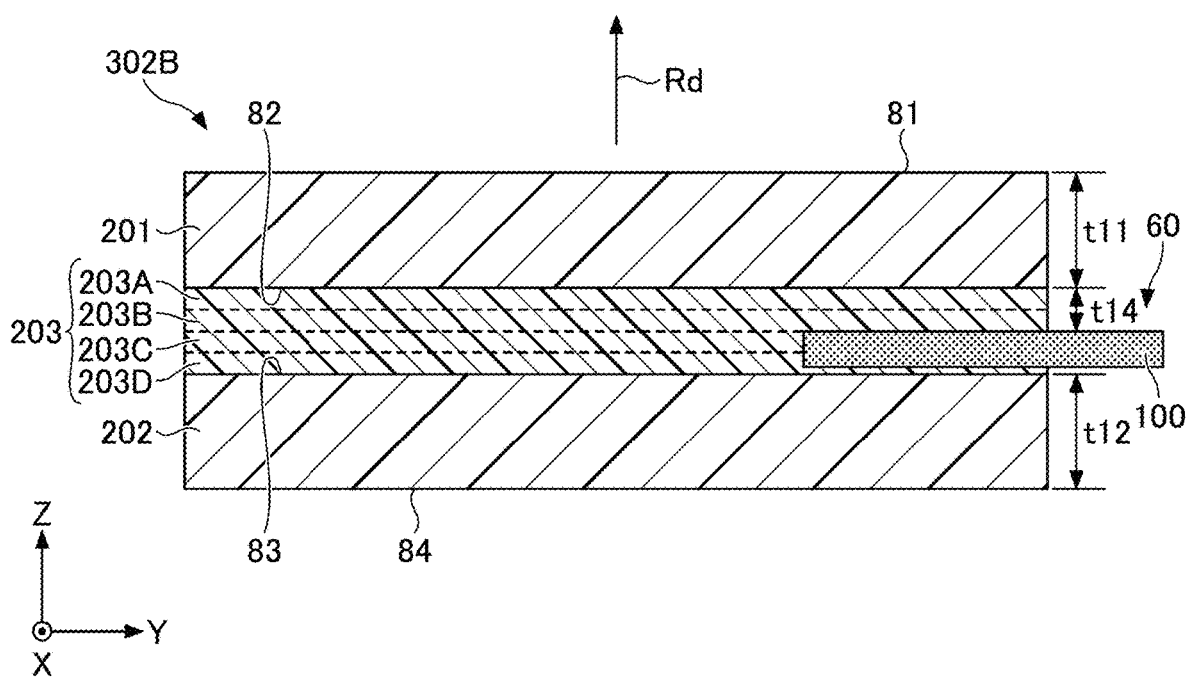
FIG. 11B is a cross sectional view illustrating in more detail the layered antenna structure according to the second configuration example.

FIG. 11B is a cross sectional view illustrating a layered antenna structure 302B to illustrate in more detail the interlayer 203 of the layered antenna structure 302 as illustrated in FIG. 11A. Although the layered antenna structure 302B as illustrated in FIG. 11B does not include the light-shielding film 204, the layered antenna structure 302B may include the light-shielding film 204 similar to the layered antenna structure 302. The layered antenna structure 302B as illustrated in FIG. 11B includes a planar antenna 100, a glass plate 201, a glass plate 202, and an interlayer 203. In FIG. 11B, the interlayer 203 is an example in which four layers of the same resin material are stacked. In the interlayer 203, a first interlayer 203A, a second interlayer 203B, a third interlayer 203C, and a fourth interlayer 203D are stacked in this order from the side of the second glass surface 82 to the side of the third glass surface 83.

The layered antenna structure 302B as illustrated in FIG. 11B is an example in which a thickness t14 of a portion from the planar antenna 100 to the second glass surface 82 is adjusted by the thicknesses of the first interlayer 203A and the second interlayer 203B. Specifically, the layered antenna structure 302B is an example in which the portion having the total thickness (t14) that is a summation of these two layers achieves the effect of the above-described matching layer. For example, in a case where the interlayer 203 is made of films such as resin films each of which the thickness is 0.38 mm or 0.76 mm, one or more films are stacked so that the thickness t14 is adjusted so that the portion having the thickness t14 functions as the matching layer. Broken lines in the interlayer 203 as illustrated in FIG. 11B indicate that four interlayers are stacked. However, in a case where these interlayers are actually made of the same (resin) material, for example, the four interlayers are made into a single interlayer 203 by heating and pressurizing the four interlayers in an autoclave, so that borders (broken line portions) are not seen appreciably.

Figure 11C:
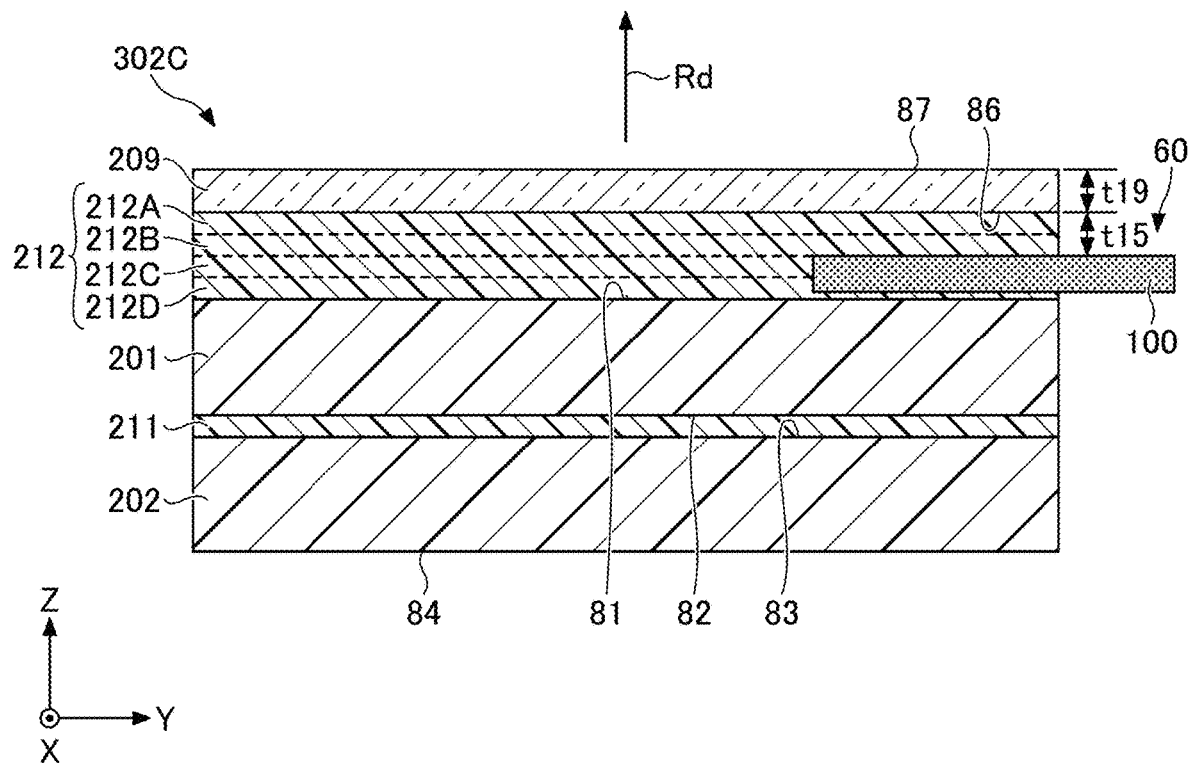
FIG. 11C is a cross sectional view illustrating a modified embodiment of the layered antenna structure according to the second configuration example.

FIG. 11C is a cross sectional view illustrating a layered antenna structure 302C that is a modified embodiment of the second configuration example of the layered antenna structure 302. Explanation about the configurations and effects similar to the above-described layered antenna structure is omitted or abbreviated by incorporating the above explanation by reference. The layered antenna structure 302C as illustrated in FIG. 11C includes a planar antenna 100, a glass plate 201, a glass plate 202, a glass plate 209, a first interlayer 211, and a second interlayer 212. The first interlayer 211 and the second interlayer 212 may be made of polyvinyl butyral (PVB), ethylene vinyl acetate copolymer (EVA), cycloolefin polymer (COP), and the like. The glass plate 209 is an example of a dielectric, and is not limited to glass but may be resin. Hereinafter, the glass plate 209, the first interlayer 211, and the second interlayer 212 are explained.

The glass plate 209 includes a fifth glass surface 86 on the side facing the glass plate 201 and a sixth glass surface 87 on the side opposite from the fifth glass surface 86.

In the form as illustrated in FIG. 11C, the first interlayer 211 is interposed between the glass plate 201 and the glass plate 202. The planar antenna 100 is located inside the second interlayer 212 so as not to come into contact with the glass plate 201 and the glass plate 209. The planar antenna 100 faces the first glass surface with a portion of the second interlayer 212 interposed between the planar antenna 100 and the first glass surface 81 of the glass plate 201, and faces the fifth glass surface 86 with a portion of the second interlayer 212 interposed between the planar antenna 100 and the fifth glass surface 86 of the glass plate 209. The second interlayer 212 may be constituted by multiple interlayers. Alternatively, the planar antenna 100 may be provided to be in contact with the first glass surface 81 of the glass plate 201 or the fifth glass surface 86 of the glass plate 209. Although the layered antenna structure 302C as illustrated in FIG. 11C does not include the light-shielding film 204, the layered antenna structure 302C may include the light-shielding film 204 similar to the layered antenna structure 302. In FIG. 11C, the second interlayer 212 is an example in which four layers of the same resin material are stacked. In the second interlayer 212, a first interlayer 212A, a second interlayer 212B, a third interlayer 212C, and a fourth interlayer 212D are stacked in this order from the side of the fifth glass surface 86 to the side of the first glass surface 81. The glass plate 209 is also referred to as a third glass plate.

When the glass plate 209 is made of a glass material of which the loss tangent at a predetermined frequency higher than 1 GHz, for example, at 28 GHz, is low, the antenna gain of the planar antenna 100 can be improved. The loss tangent (tan δ) of the glass plate 209 may be 0.010 or less, preferably 0.008 or less, and more preferably 0.005 or less. The glass plate 209 may be made of, for example, alkaline-free glass. A thickness t19 of the glass plate 209 can be determined as appropriately depending on the purpose of the layered antenna structure 302C, and can be adjusted in a range of, for example, 0.5 mm to 10 mm.

The layered antenna structure 302C as illustrated in FIG. 11C is an example in which a thickness t15 of a portion from the planar antenna 100 to the fifth glass surface 86 is adjusted by the thicknesses of the first interlayer 212A and the second interlayer 212B. Specifically, the layered antenna structure 302C is an example in which the portion having the total thickness (t15) that is a summation of these two layers achieves the effect of the above-described matching layer. Broken lines in the second interlayer 212 as illustrated in FIG. 11C indicate that four interlayers are stacked. However, in a case where these interlayers are actually made of the same (resin) material, for example, the four interlayers are made into a single second interlayer 212 by heating and pressurizing the four interlayers in an autoclave, so that borders (broken line portions) are not seen appreciably.

Figure 11D:
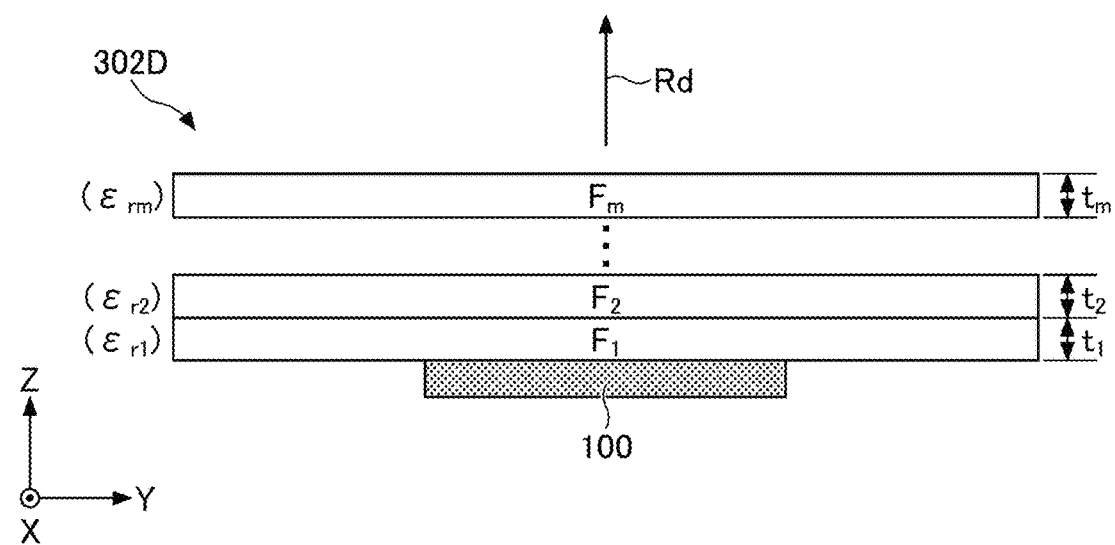
FIG. 11D is a cross sectional view for explaining a configuration for increasing an antenna efficiency of a layered antenna structure.

Hereinafter explained is a design for capability of effectively radiating electromagnetic waves to the outside of the dielectric of a layered antenna structure 302D including a planar antenna and the dielectric provided (stacked) in the radiation direction of the planar antenna. The layered antenna structure 302D as illustrated in FIG. 11D includes one or more layers of a dielectric, other than air, being stacked in the radiation direction Rd (positive Z axis direction) from the planar antenna 100. In addition, m layers of a dielectric, i.e., a first dielectric $F_1$, a second dielectric $F_2$, . . . , and an m-th dielectric $F_m$ are assumed to be stacked in the positive Z axis direction, i.e., electromagnetic waves radiation direction, with respect to the planar antenna 100. In this case, m is an integer equal to or more than one. The first dielectric $F_1$ has a thickness $t_1$ and a relative permittivity $\varepsilon_{r1}$. The second dielectric $F_2$ has a thickness $t_2$ and a relative permittivity $\varepsilon_{r2}$. The m-th dielectric $F_m$ has a thickness $t_m$ and a relative permittivity $\varepsilon_{rm}$.

Electrical lengths of thicknesses of the layers of the dielectric are denoted as $L_1$, $L_2$, . . . , and $L_m$. Where an electrical length of a thickness of the x-th layer of a dielectric is denoted as $L_x$ (x is an integer of 1 to m), $L_x$ is expressed by Expression (1).

Expression 1

$$L_x = \frac{t_x}{(1/\sqrt{\varepsilon_{rx}})} \quad (1)$$

In the layered antenna structure 302D, a summation of electrical lengths $L_1+L_2+\ldots+L_m$ from the first dielectric $F_1$ to the m-th dielectric $F_m$ may satisfy the Expression (2). In this case, in the Expression (2), N is an integer equal to or more than zero, and $\lambda_0$ denotes a wavelength (unit: mm) in air at the predetermined frequency radiated by the planar antenna 100 (this is also applicable to the Expression (3) and the Expression (4) explained later).

Expression 2

$$\frac{1+(N\times 2)}{4} \times 0.85 \times \lambda_0 \leq \sum_{x=1}^{m} L_x \leq \frac{1+(N\times 2)}{4} \times 1.15 \times \lambda_0 \quad (2)$$

In the layered antenna structure 302D, a summation of electrical lengths $L_1+L_2+\ldots+L_m$ from the first dielectric $F_1$ to the m-th dielectric $F_m$ preferably satisfies the Expression (3) and more preferably satisfies the Expression (4).

Expression 3

$$\frac{1+(N\times 2)}{4} \times 0.90 \times \lambda_0 \leq \sum_{x=1}^{m} L_x \leq \frac{1+(N\times 2)}{4} \times 1.10 \times \lambda_0 \quad (3)$$

Expression 4

$$\frac{1+(N\times 2)}{4} \times 0.95 \times \lambda_0 \leq \sum_{x=1}^{m} L_x \leq \frac{1+(N\times 2)}{4} \times 1.05 \times \lambda_0 \quad (4)$$

Figure 11E:
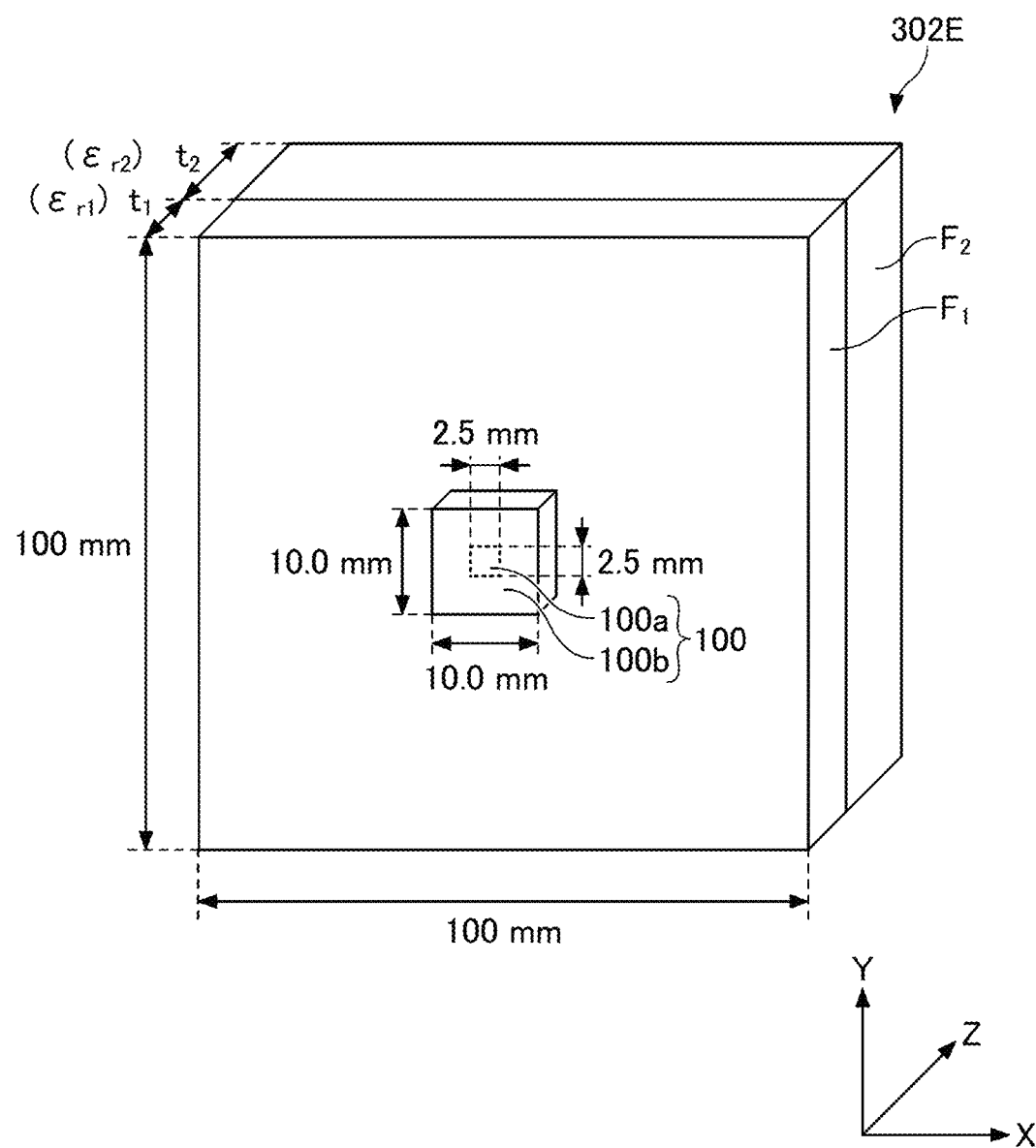
FIG. 11E is a perspective view illustrating an layered antenna structure that is being simulated.

Next, an example in which simulation has been performed with respect to the layered antenna structure 302D of FIG. 11D is explained. FIG. 11E is a schematic perspective view illustrating a layered antenna structure 302E on which simulation has been performed. The planar antenna 100 includes a dielectric 100b and a planar conductor 100a. The dielectric 100b is in a shape of a rectangular parallelepiped with 10.0 mm in length and 10.0 mm in width and with a predetermined thickness (in the Z axis direction). The planar conductor 100a is provided on the center of the surface on the side of the positive Z axis direction (on the side of the first dielectric $F_1$) of the dielectric 100b, and is in a shape of a square with 2.5 mm in length and 2.5 mm in width. The layered antenna structure 302E has a configuration in which two layers of a dielectric, i.e., the first dielectric $F_1$ and the second dielectric $F_2$, are stacked in this order so as to face the planar conductor 100a of the planar antenna 100. The first dielectric $F_1$ and the second dielectric $F_2$ have predetermined thicknesses $t_1$, $t_2$, respectively, and have a square shape with 100 mm×100 mm in the XY plane. The planar antenna 100 is located at the center of the first dielectric $F_1$ and the second dielectric $F_2$ in a plan view in the Z axis direction.

Figure 11F:
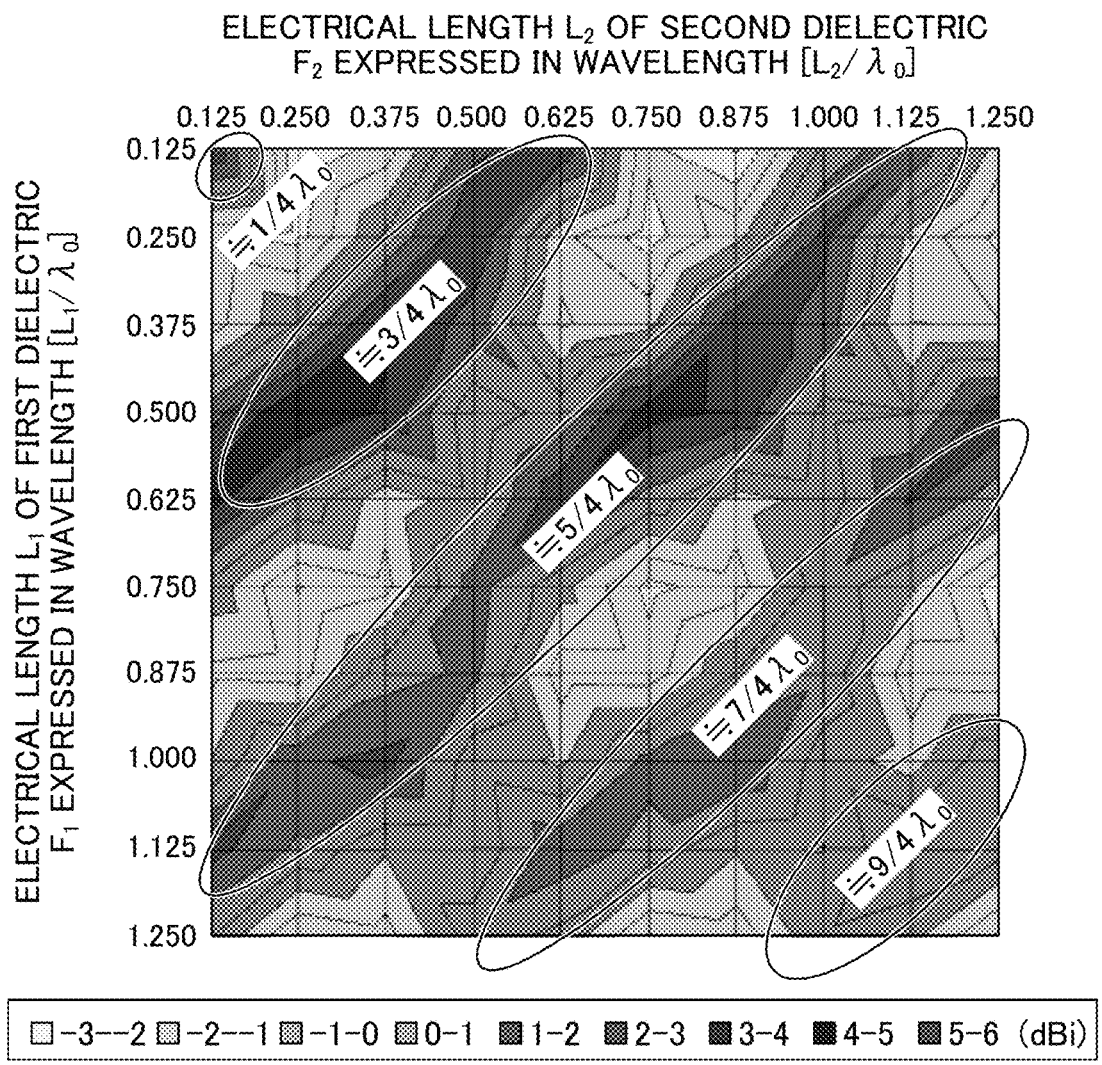
FIG. 11F is a simulation result of a layered antenna structure.

With the layered antenna structure 302E, where the relative permittivity $\varepsilon_{r1}$ is set to 2.6 in the first dielectric $F_1$, and the relative permittivity $\varepsilon_{r2}$ is set to 6.8 in the second dielectric $F_2$, a result of the antenna gain is obtained by varying the electrical length $L_1$ of the first dielectric $F_1$ and the electrical length $L_2$ of the second dielectric $F_2$ (see FIG. 11F). In this case, the target frequency of the planar antenna 100 is set to 28 GHz, and accordingly, $\lambda_0$ is assumed to be 10.7 mm.

In FIG. 11F, the horizontal axis denotes $L_2/\lambda_0$, and the vertical axis denotes $L_1/\lambda_0$, and FIG. 11F shows a simulation result of the gain (unit: dBi) of the radiation direction Rd of the planar antenna 100 when $L_1$ and $L_2$ are varied. According to this result, the above-described Expression (2) is satisfied, and it can be confirmed that the antenna gain of the planar antenna 100 is increased.

Figure 12:
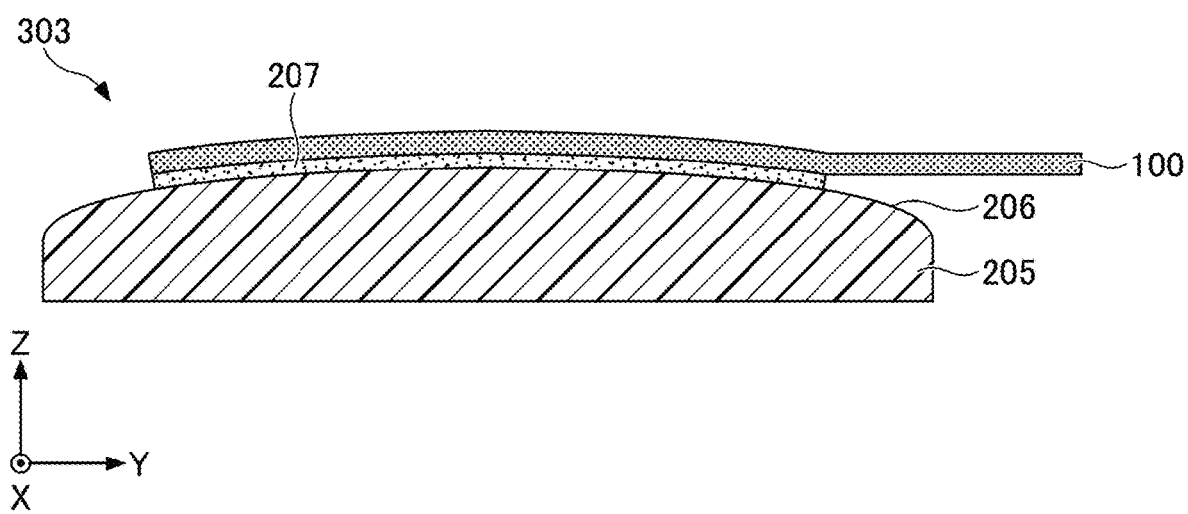
FIG. 12 is a cross sectional view illustrating an layered antenna structure according to a third configuration example.

FIG. 12 is a cross sectional view illustrating a layered antenna structure 303 according to a third configuration example. The layered antenna structure 303 as illustrated in FIG. 12 includes a planar antenna 100 and a curved surface body 205 of a dielectric. The curved surface body 205 includes a curved surface 206. At least a portion of the planar antenna 100 is bonded by a bonding layer 207 to the curved surface 206. In the planar antenna 100, resin is used as the dielectric layer 40 to achieve flexibility, and accordingly, the planar antenna 100 can be readily fixed to the curved surface 206. The curved surface body 205 is not limited to a convex surface, and may be a concave surface. Alternatively, the curved surface body 205 may have a wavy surface.

Figure 13:
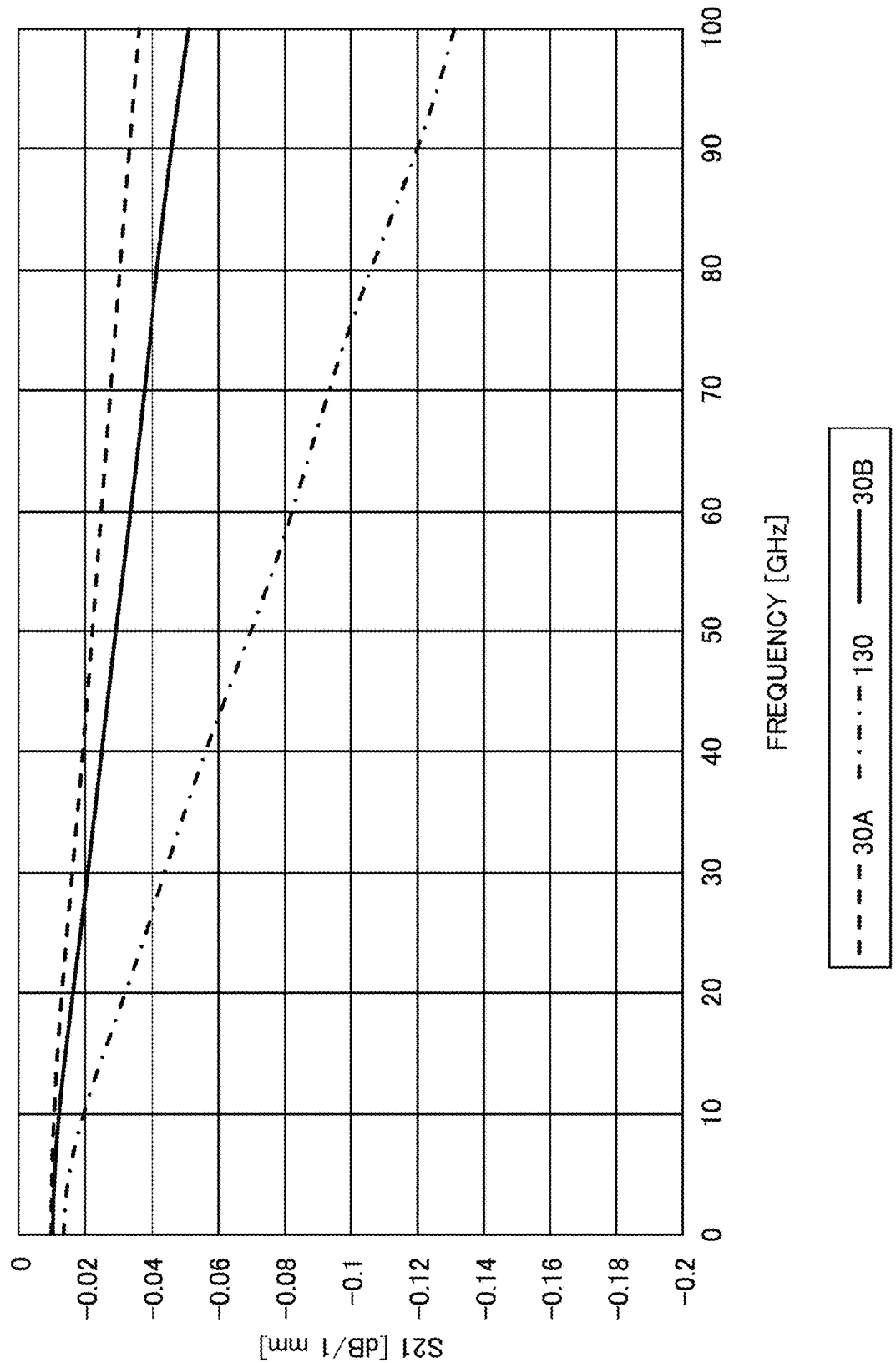
FIG. 13 is a drawing illustrating an example of a simulation result of a microstrip line.
Figure 14:
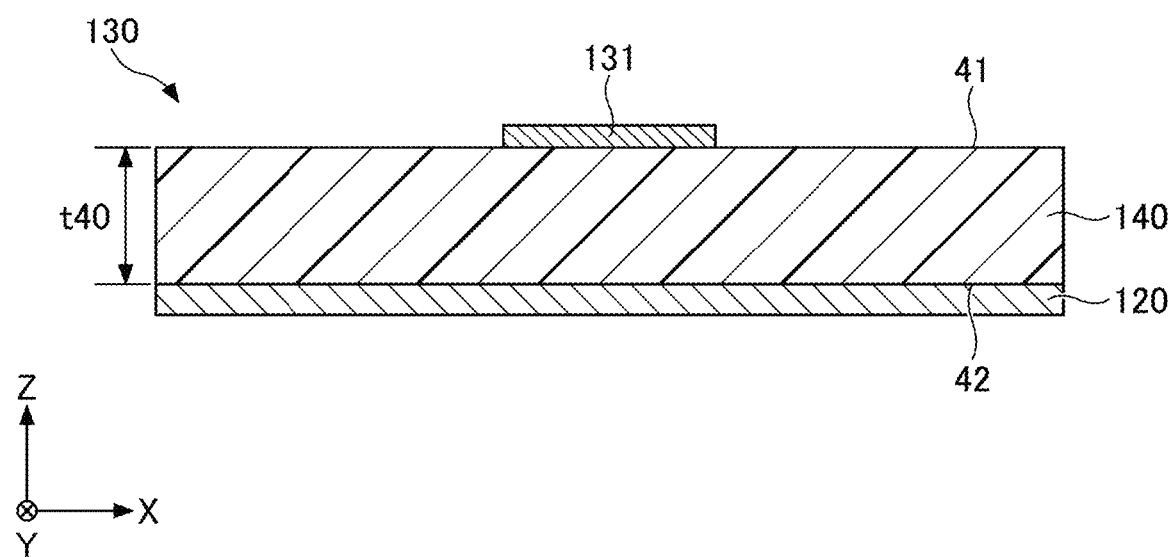
FIG. 14 is a cross sectional view illustrating a comparative example of a microstrip line.

FIG. 13 is a drawing illustrating an example of a simulation result of the transmission coefficient S21 of a microstrip line in a case of the transmission line 30A (FIG. 2), the transmission line 30B (FIG. 3), and the transmission line 130 (FIG. 14). In either case, the result is calculated with the microstrip line of the form as illustrated in FIG. 15.

Figure 15:
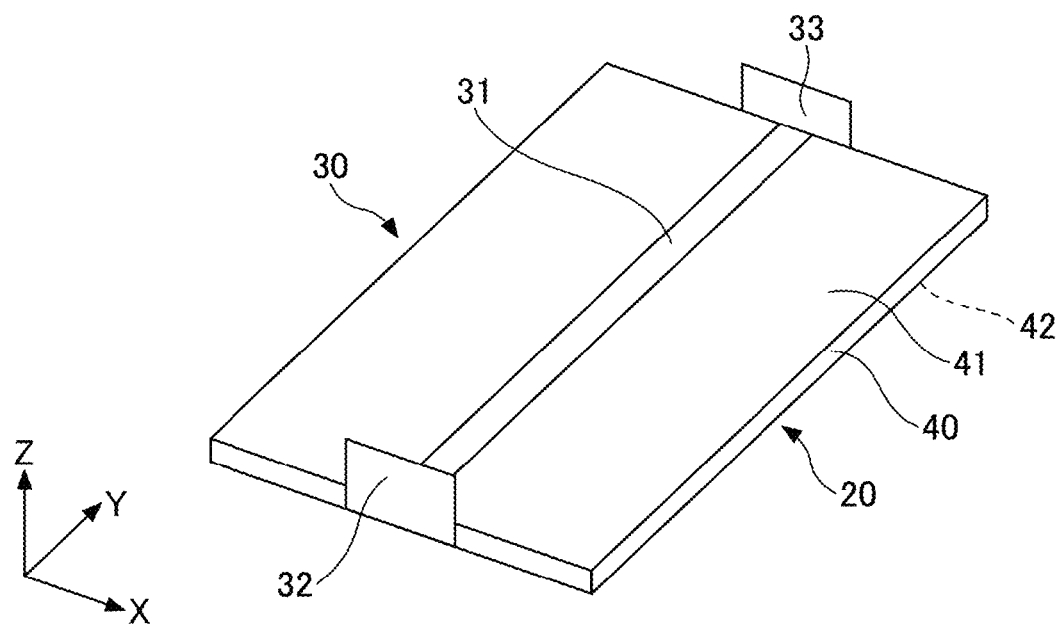
FIG. 15 is a perspective view illustrating a configuration of a microstrip line in simulation.

In the simulation of FIG. 13, the conditions of the microstrip line as illustrated in FIG. 15 are as follows.
Material of the signal line 31: copper
Thickness of the signal line 31: 5 μm
Width of the signal line 31: 0.32 mm
Length of the signal line 31: 25 mm
Material of the ground conductor 20: copper
Thickness of the ground conductor 20: 5 μm Sizes of the dielectric layer 40 and the ground conductor 20: 25 mm in length and 5 mm in width Table 1 to Table 3 indicate setting values during the simulation of FIG. 13. $\varepsilon_r$ denotes a relative permittivity, and tan δ denotes a loss tangent.

TABLE 1

| CONFIGURATION | THICKNESS | $\varepsilon_r$ | tan δ |
|---|---|---|---|
| DIELECTRIC LAYER 40 | t0 = 100 μm | 2.0 | 0.001 |

Table 1 shows setting values of the transmission line 30A of FIG. 2, and the dielectric layer 40 is assumed to be formed by a tetrafluoroethylene-based polymer. Specifically, Table 1 assumes a case of obtaining a fluorine-containing copolymer containing a copolymerization composition with a unit based on TFE/a unit based on PPVE/a unit based on NAH being 97.9/2.0/0.1 (mol %) according to the procedure recited in paragraph [0123] of the International Publication No. 2016/017801. The film-shaped tetrafluoroethylene-based polymer (fluorine-containing copolymer having the above composition may also be hereinafter referred to as a "resin F") can be obtained by, for example, using an extrusion molding machine with a coat-hanger die to perform extrusion molding to obtain a predetermined thickness at a temperature of about 340° C.

TABLE 2

| CONFIGURATION | THICKNESS | $\varepsilon_r$ | tan δ |
|---|---|---|---|
| RESIN LAYER 43 | t3 = 25 μm | 2.0 | 0.001 |
| RESIN LAYER 45 | t5 = 50 μm | 3.6 | 0.003 |
| RESIN LAYER 44 | t4 = 25 μm | 2.0 | 0.001 |

Table 2 shows setting values of the transmission line 30B of FIG. 3, and assumes a case where the first resin layer 43 and the second resin layer 44 are formed by a tetrafluoroethylene-based polymer (the resin F), and the third resin layer 45 is formed by a polyimide resin.

TABLE 3

| CONFIGURATION | THICKNESS | $\varepsilon_r$ | tan δ |
|---|---|---|---|
| DIELECTRIC LAYER 140 | t40 = 100 μm | 3.6 | 0.007 |

Table 3 shows setting values of the transmission line 130 of FIG. 14, and assumes a case where the dielectric layer 140 is formed by a polyimide resin. The transmission line 130 is a microstrip line including a dielectric layer 140, a signal line 131 provided on the first main surface 141 of the dielectric layer 140, and a ground conductor 120 provided on the second main surface 142 of the dielectric layer 140.

The vertical axis of FIG. 13 indicates the transmission loss (the transmission coefficient S21) per 1 mm of the transmission line, and indicates that the transmission loss of the transmission line increases in accordance with a decrease in the transmission coefficient S21.

TABLE 4

| CONFIGURATION | LOSS @28 GHz |
|---|---|
| TRANSMISSION LINE 30A | −0.015 dB |
| TRANSMISSION LINE 30B | −0.020 dB |
| TRANSMISSION LINE 130 | −0.042 dB |

Table 4 shows transmission loss per 1 mm of the transmission line at a frequency of 28 GHz. Table 4 indicates a result that the transmission lines 30A, 30B using a tetrafluoroethylene-based polymer (the resin F) for the dielectric layer more greatly alleviates the transmission loss of the transmission line than the transmission line 130 using only polyimide resin for the dielectric layer.

Figure 16:
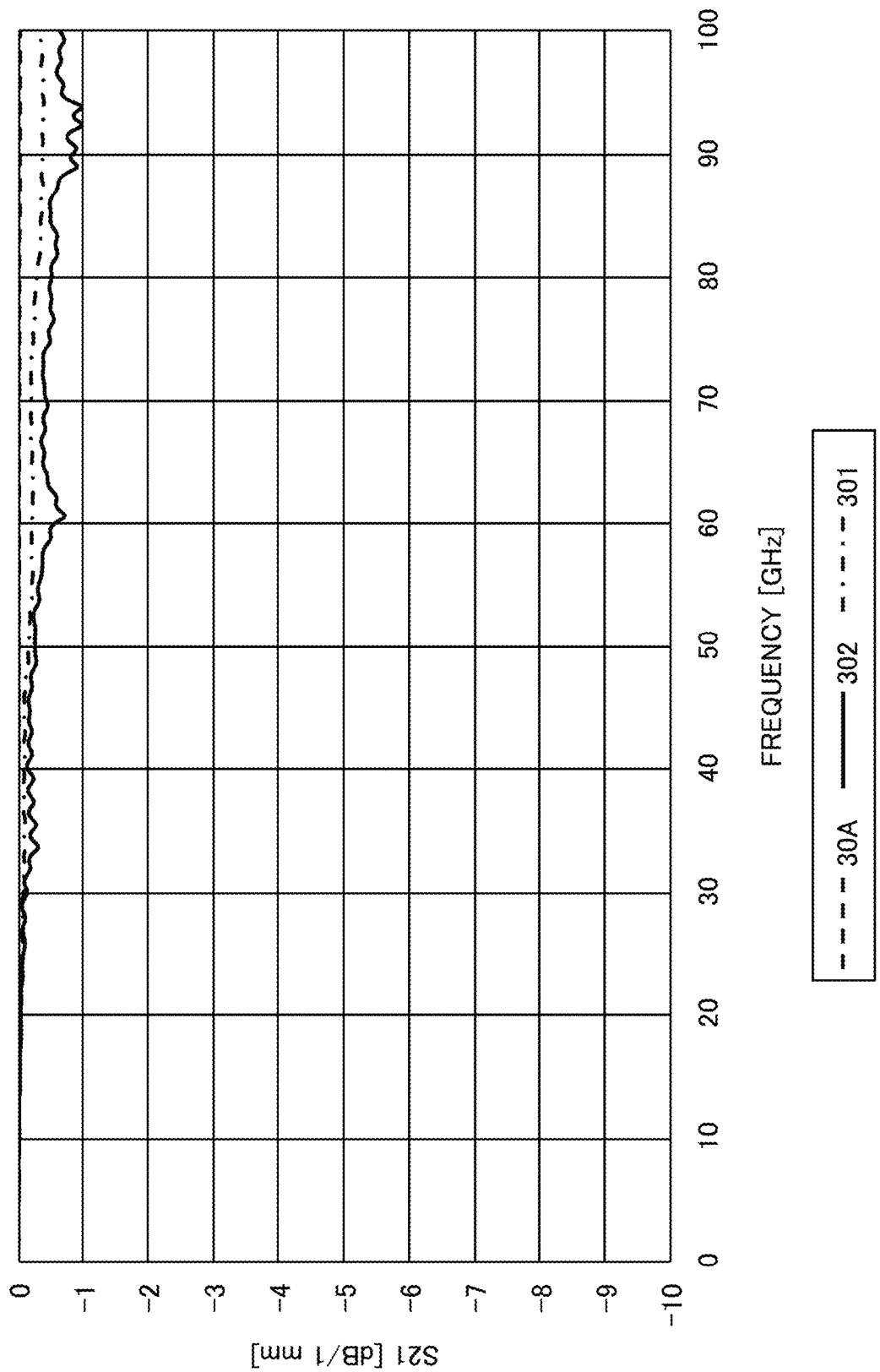
FIG. 16 is a drawing illustrating an example of a simulation result of a layered antenna structure.

FIG. 16 is a drawing illustrating an example of a simulation result of the transmission coefficient S21 with regard to a difference in the sealing surface of the microstrip line. FIG. 16 is a result calculated with each of transmission line 30A alone (FIG. 2), the layered antenna structure 301 (FIG. 17), and the layered antenna structure 302 (FIG. 18). In the layered antenna structure 301 (FIG. 17), the transmission line 30A is in contact with the third glass surface 83. In the layered antenna structure 302 (FIG. 18), the transmission line 30A is provided between a pair of interlayers 203A and 203B.

The setting values during simulation of FIG. 16 are as follows.

Thickness t11 of the glass plate 201: 2.0 mm
Thickness t12 of the glass plate 202: 2.0 mm
The thickness t13 of the interlayer 203: 0.76 mm
Thickness t13a of the first interlayer 203A: 0.38 mm
Thickness t13b of the second interlayer 203B: 0.38 mm The first interlayer 203A and the second interlayer 203B correspond to the above-described first portion interlayer and second portion interlayer, respectively.

In the simulation of FIG. 16, as illustrated in FIG. 15, the transmission line 30A is assumed to be a microstrip line, and other simulation conditions are the same as in the above-described conditions for the simulation of FIG. 13 and Table 1.

TABLE 5

Figure 17:
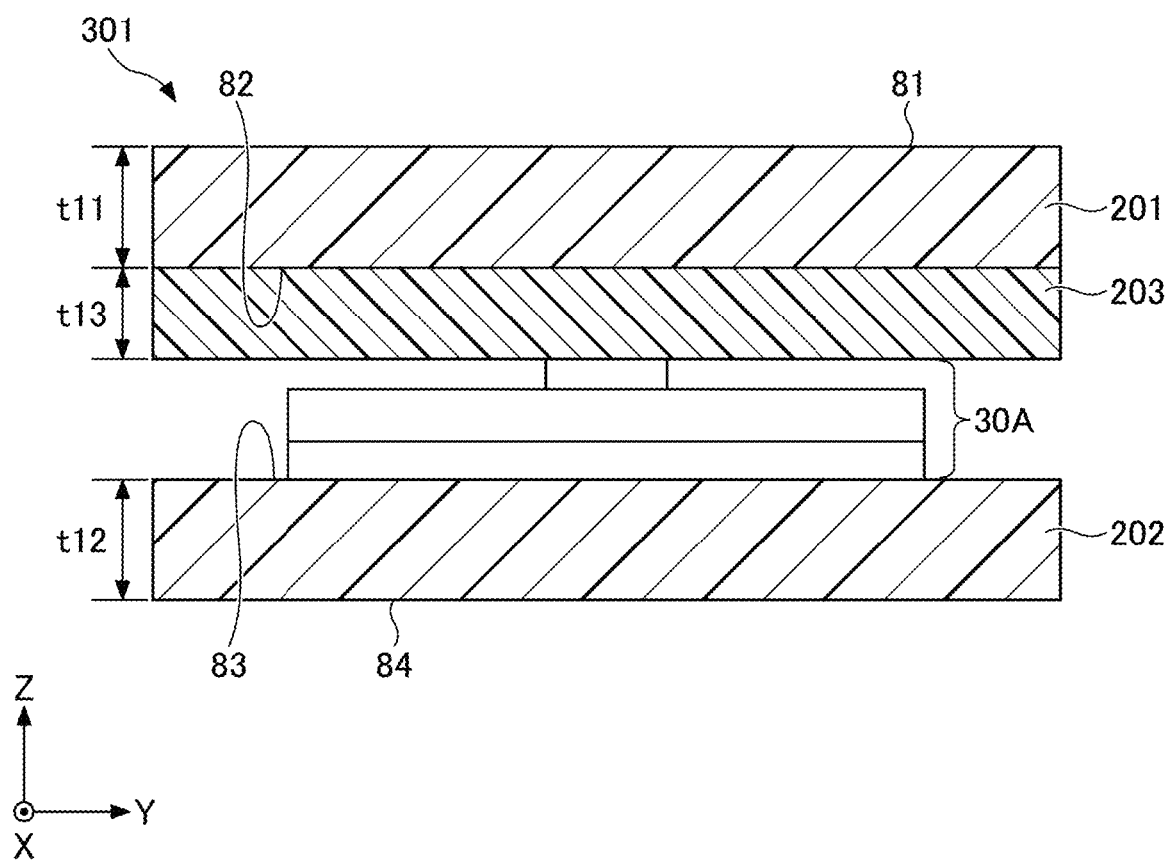
FIG. 17 is a cross sectional view illustrating the layered antenna structure according to the first configuration example in simulation.
Figure 18:
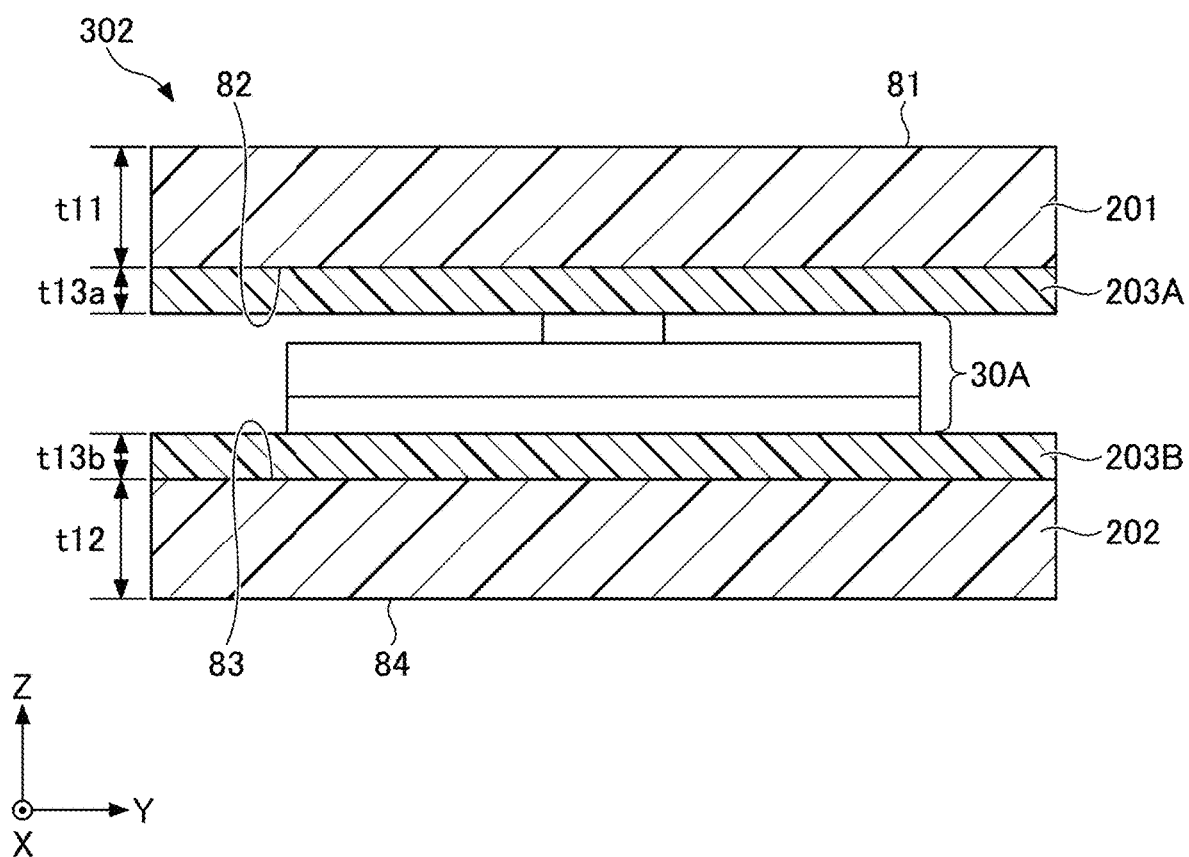
FIG. 18 is a cross sectional view illustrating the layered antenna structure according to the second configuration example in simulation.

| SEALING CONFIGURATION | LOSS @28 GHz |
|---|---|
| FIG. 2 | −0.015 dB |
| FIG. 18 | −0.110 dB |
| FIG. 17 | −0.073 dB |

Table 5 illustrates the transmission loss per 1 mm of the transmission line at a frequency of 28 GHz. As shown in Table 5, in any of the cases of the layered antenna structure 301 (FIG. 17) and the layered antenna structure 302 (FIG. 18), an effect of alleviating the transmission loss equivalent to the effect obtained from the transmission line 30A alone is obtained. Although FIG. 17 and FIG. 18 disclose the gap between the glass plates 201 and 202 for the sake of convenience, actually, the obtained characteristics may be considered to be characteristics of a layered antenna structure sealed without any gap.

Figure 19:
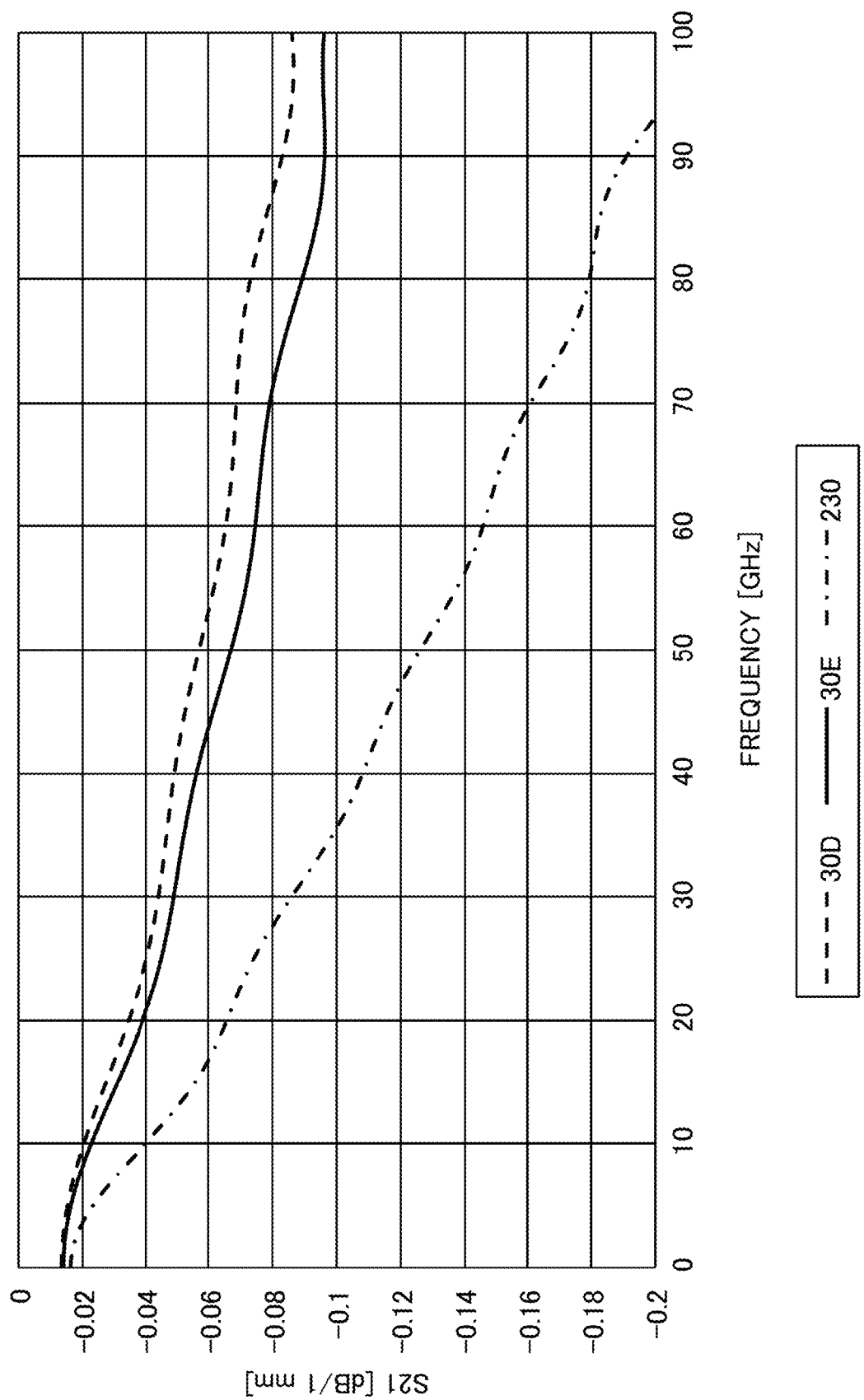
FIG. 19 is a drawing illustrating an example of a simulation result of a strip line.
Figure 20:
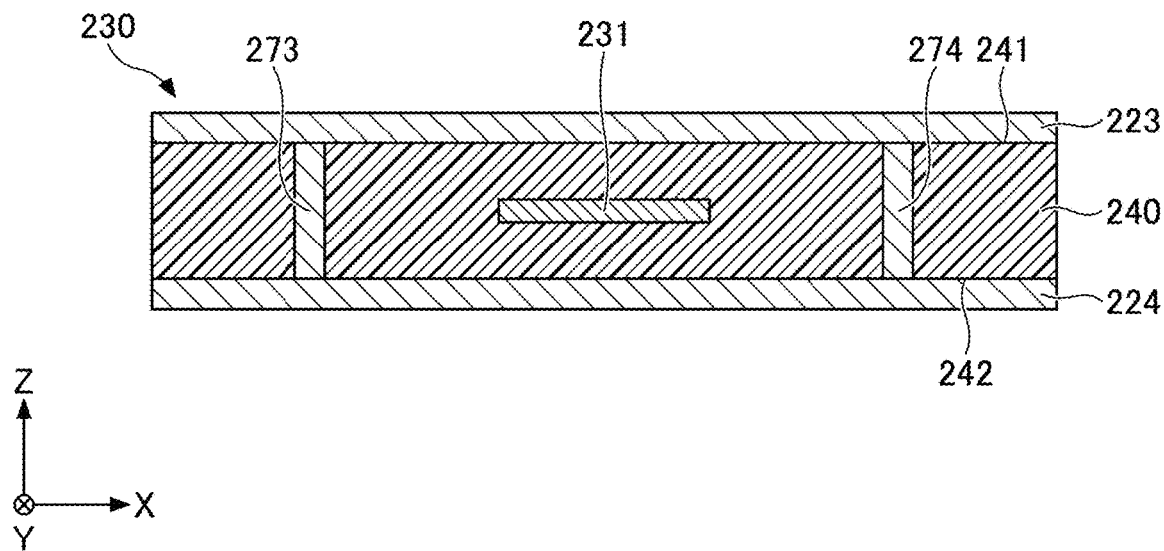
FIG. 20 is a cross sectional view illustrating a comparative example of a strip line.

FIG. 19 is a drawing illustrating an example of a simulation result of a transmission coefficient S21 of a strip line in a case of each of the transmission line 30D (FIG. 5), the transmission line 30E (FIG. 6), and the transmission line 230 (FIG. 20). Any of the cases is a result calculated with the strip line in the form as illustrated in FIG. 21.

Figure 21:
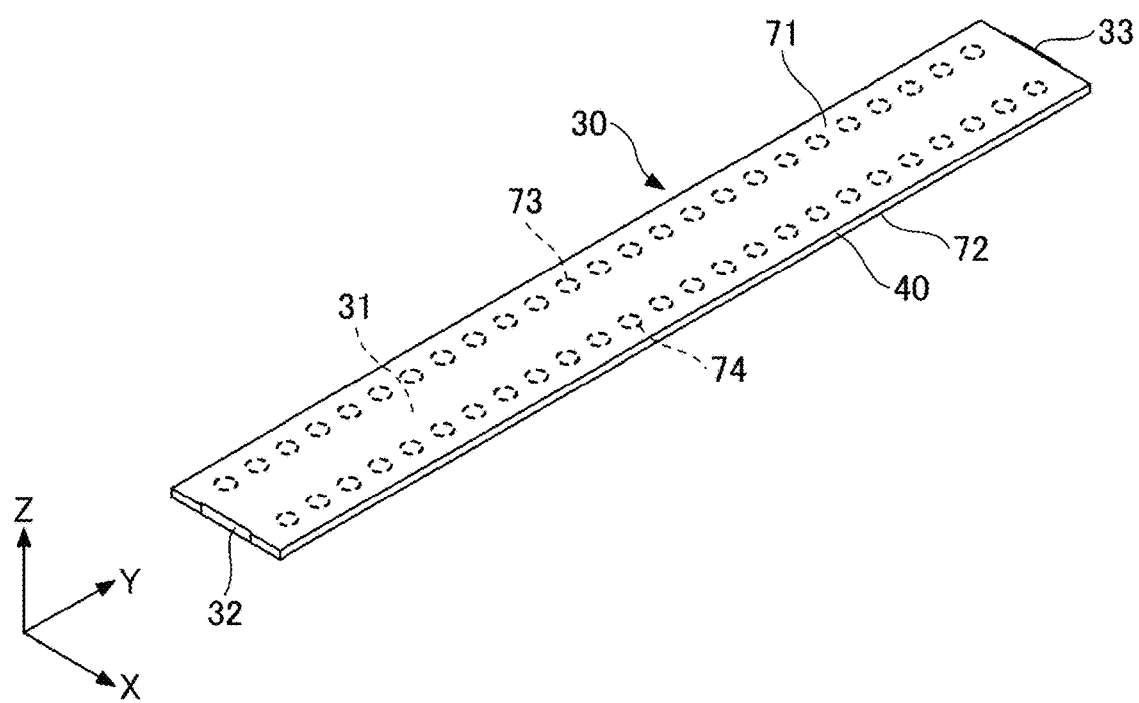
FIG. 21 is a perspective view illustrating a configuration of a strip line in simulation.

In the simulation of FIG. 19, the conditions of the strip line as illustrated in FIG. 21 are as follows.

Length of the dielectric layer 40 and the ground conductors 71 and 72 in the X axis direction: 5 mm
Length of the dielectric layer 40 and the ground conductors 71 and 72 in the Y axis direction: 25 mm
Material of the ground conductors 71 and 72: copper
Thickness of the ground conductors 71 and 72: 5 μm
Material of the conductor walls 73 and 74: copper
Distance between the conductor walls 73 and 74 in the X axis direction: 2.5 mm
Distance between the centers of vias neighboring in the Y axis direction of multiple vias constituting the conductor walls 73 and 74: 1 mm
Diameter of vias, in a plan view (from the Z axis direction), of the conductor walls 73 and 74: 0.5 mm
Material of the signal line 31 (FIGS. 5, 6) and a signal line 231 (FIG. 20): copper
Length in the Y axis direction of the signal line 31 (FIGS. 5, 6) and the signal line 231 (FIG. 20): 25 mm
Width of the signal line 31 (FIGS. 5, 6) and the signal line 231 (FIG. 20): 0.32 mm
Thickness of the signal line 31 (FIGS. 5, 6) and the signal line 231 (FIG. 20): 5 μm
Table 6 to Table 8 illustrate setting values during the simulation of FIG. 19. $\varepsilon_r$ denotes a relative permittivity, and tan δ denotes a loss tangent.

TABLE 6

| CONFIGURATION | THICKNESS | $\varepsilon_r$ | tan δ |
|---|---|---|---|
| DIELECTRIC LAYER 40 | t9 = 100 μm | 2.0 | 0.001 |

Table 6 shows setting values of the transmission line 30D of FIG. 5, and assumes a case in a case where the dielectric layer 40 is formed by a tetrafluoroethylene-based polymer (the resin F).

TABLE 7

| CONFIGURATION | THICKNESS | $\varepsilon_r$ | tan δ |
|---|---|---|---|
| RESIN LAYER 46 | t6 = 25 μm | 3.6 | 0.003 |
| RESIN LAYER 48 | t8 = 50 μm | 2.0 | 0.001 |
| RESIN LAYER 47 | t7 = 25 μm | 3.6 | 0.003 |

Table 7 shows setting values of the transmission line 30E of FIG. 6, and assumes a case where the first resin layer 46 and the second resin layer 47 are formed by a polyimide resin, and the third resin layer 48 is formed by a tetrafluoroethylene-based polymer (the resin F).

TABLE 8

| CONFIGURATION | THICKNESS | $\varepsilon_r$ | tan δ |
|---|---|---|---|
| DIELECTRIC LAYER 240 | 100 μm | 3.6 | 0.007 |

Table 8 shows setting values of the transmission line 230 of FIG. 20, and assumes a case where a dielectric layer 240 is formed by a polyimide resin. The transmission line 230 is a strip line including the dielectric layer 240, a ground conductor 223 provided on a first main surface of the dielectric layer 240, a ground conductor 224 provided on a second main surface of the dielectric layer 140, and a signal line 231 provided inside the dielectric layer 140. The transmission line 230 includes conductor walls 273 and 274 connecting the ground conductors 223 and 224.

The vertical axis of FIG. 19 indicates the transmission loss (transmission coefficient S21) per 1 mm of the transmission line, and indicates that the transmission loss of the transmission line increases in accordance with a decrease in the transmission coefficient S21.

TABLE 9

| BASE MATERIAL CONFIGURATION | LOSS @28 GHZ |
|---|---|
| TRANSMISSION LINE 30D | −0.043 dB |
| TRANSMISSION LINE 30E | −0.048 dB |
| TRANSMISSION LINE 230 | −0.081 dB |

Table 9 illustrates the transmission loss per 1 mm of the transmission line at a frequency of 28 GHz. Table 9 indicates a result that the transmission lines 30D, 30E using a tetrafluoroethylene-based polymer (the resin F) for the dielectric layer more greatly alleviates the transmission loss of the transmission line than the transmission line 230 using only a polyimide resin for the dielectric layer.

Figure 22:
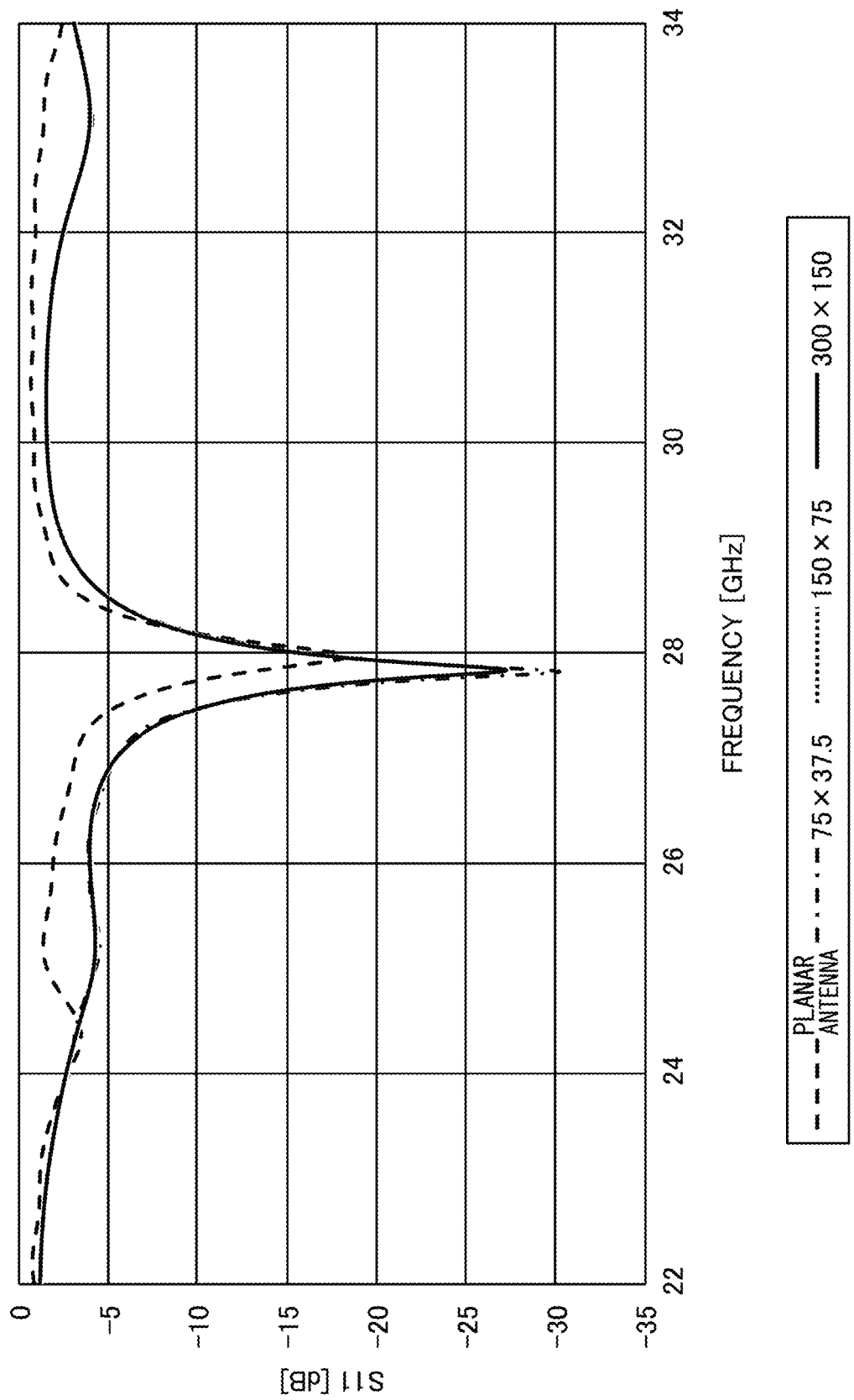
FIG. 22 is a drawing illustrating an example of a simulation result of a layered antenna structure.
Figure 23:
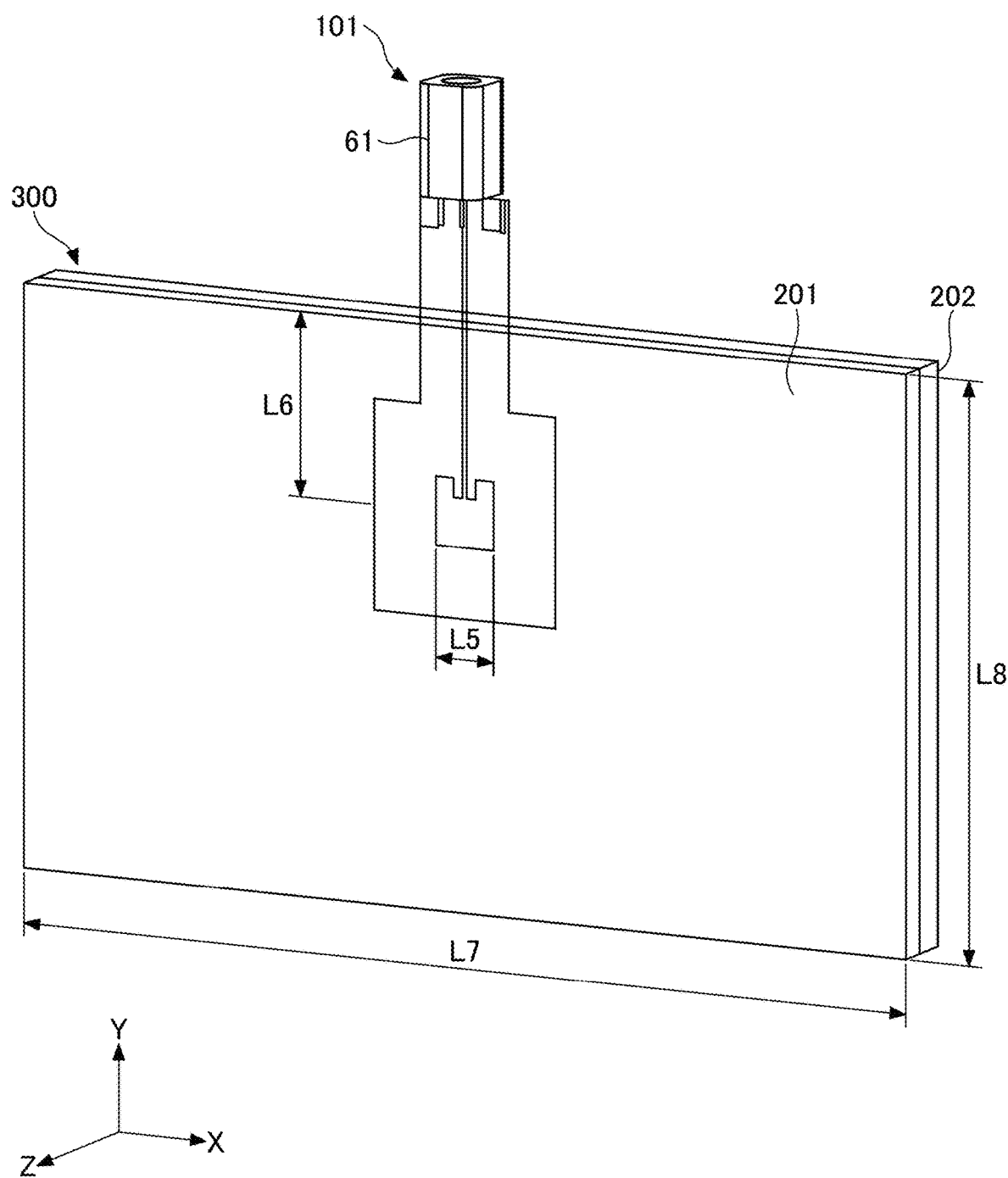
FIG. 23 is a perspective view illustrating a configuration of a layered antenna structure in simulation.

FIG. 22 is a drawing illustrating an example of a simulation result of the return loss coefficient S11 of the planar antenna 101 alone (FIG. 1) and the layered antenna structure 300 (FIG. 23) in which the planar antenna 101 (FIG. 1) is sealed. In the simulation of FIG. 22, the transmission line 30 of the planar antenna 101 is the transmission line 30B (FIG. 3), and the layered antenna structure 300 is in the form as illustrated in FIG. 10.

The setting values during simulation of FIG. 22 are as follows.
   Thickness t11 of the glass plate 201: 2.0 mm
   Thickness t12 of the glass plate 202: 2.0 mm
   Thickness t13 of the interlayer 203: 0.76 mm
   Thickness t3 of the first resin layer 43: 25 μm
   Thickness t4 of the second resin layer 44: 25 μm
   Thickness t5 of the third resin layer 45: 50 μm
   L1 (FIG. 1): 10.00 mm
   L2 (FIG. 1): 10.00 mm
   L3 (FIG. 1): 5.00 mm
   L4 (FIG. 1): 10.00 mm
   L5 (of the planar antenna 101 alone): 3.35 mm
   L5 (of the layered antenna structure 300): 3.24 mm
   L6: 10.00 mm The first resin layer 43 and the second resin layer 44 are assumed to be formed by the tetrafluoroethylene-based polymer (the resin F) of which the loss tangent is 0.001 and the relative permittivity is 2.0, and the third resin layer 45 is formed by a polyimide resin of which the loss tangent is 0.01 and the relative permittivity is 3.0.

TABLE 10

| SEALING SIZE (L7 × L8) | PLANAR ANTENNA 101 ALONE | 75 × 37.5 | 150 × 75 | 300 × 150 |
|---|---|---|---|---|
| GAIN (ONLY IN VIEW OF RADIATION EFFICIENCY) | 5.4 dBi | 2.1 dBi | 2.4 dBi | 2.4 dBi |
| RADIATION EFFICIENCY | −2.8 dB | −4.3 dB | −5.0 dB | −5.4 dB |

Table 10 shows an example of a result obtained by calculating the antenna gain and the radiation efficiency while changing the sizes of the glass plates 201, 202 for sealing the planar antenna 101. In any case, at around the frequency of 28 GHz, sufficient return loss characteristics, antenna gain, and radiation efficiency are obtained.

The planar antenna, the layered antenna structure, and the window glass for vehicle have been hereinabove described with reference to the embodiment, but the present invention is not limited to the above-described embodiment. Various modifications and improvements such as combination and replacement with a portion or the entirety of another embodiment can be made without departing from the subject matter of the present invention.

For example, the degree of transparency of the antenna conductor for visible light may be lower or higher than that of the dielectric layer, or the same as that of the dielectric layer. Also, the line-shaped conductors constituting the antenna conductor and the like may be formed in a mesh shape in such a manner as to make gaps, or may be formed in a stripe shape formed in such a manner as to make gaps.

The external shape of the antenna conductor may be other shapes such as circular shapes and the like. Also, radio frequency power may be fed to the antenna conductor via other feeding lines such as feeding pins, through holes, and the like.

What is claimed is:

1. A layered antenna structure comprising:
a planar antenna; and
m layers of a dielectric, m being an integer equal to or more than one, on which the planar antenna is layered, wherein, where an electrical length of a thickness of an x-th layer of a dielectric is denoted as $L_x$, x being an integer equal to or more than one, $L_x$ is expressed as:

$$L_x = \frac{t_x}{(1/\sqrt{\varepsilon_{rx}})},$$

and
wherein $t_x$ is a thickness of the x-th layer of the dielectric and $\varepsilon_{rx}$ is a relative permittivity of the x-th layer of the dielectric;
where a wavelength of a predetermined frequency in air is denoted as $\lambda_0$, and N is an integer equal to or more than zero, the layered antenna structure satisfies:

$$\frac{1+(N\times 2)}{4}\times 0.85 \times \lambda_0 \leq \sum_{x=1}^{m} L_x \leq \frac{1+(N\times 2)}{4}\times 1.15 \times \lambda_0;$$

wherein the planar antenna comprises:
a dielectric layer including a first surface and a second surface on a side opposite from the first surface;
an antenna conductor provided on the first surface;
a ground conductor provided on the first surface or the second surface, or provided on both of the first surface and the second surface; and
a transmission line including a signal line that is connected to the antenna conductor or provided in proximity to the antenna conductor,
wherein a dielectric portion of the dielectric layer that is in contact with the signal line has a loss tangent of 0.007 or less at 28 GHz.

2. The layered antenna structure according to claim 1, wherein the dielectric layer includes a resin layer.

3. The layered antenna structure according to claim 2, wherein the dielectric portion is formed by the resin layer.

4. The layered antenna structure according to claim 2, wherein the resin layer contains a tetrafluoroethylene-based polymer.

5. The layered antenna structure according to claim 4, wherein the dielectric portion is made of the tetrafluoroethylene-based polymer.

6. The layered antenna structure according to claim 1, wherein the dielectric layer is constituted by only a single layer.

7. The layered antenna structure according to claim 2, wherein the ground conductor is provided on the second surface,
wherein the resin layer includes:
a first resin layer having the first surface;
a second resin layer having the second surface; and
a third resin layer provided between the first resin layer and the second resin layer in a thickness direction of the dielectric layer, and
wherein the third resin layer is made of a resin material that is different from the first resin layer and the second resin layer.

8. The layered antenna structure according to claim 7, wherein the first resin layer or the second resin layer includes a tetrafluoroethylene-based polymer, or both of the first resin layer and the second resin layer include the tetrafluoro ethylene-based polymer.

9. The layered antenna structure according to claim 7, wherein the third resin layer includes at least one of a polyimide-based resin, a polyethylene-based resin, a cycloolefin-based resin, a polyester-based resin, an epoxy-based resin, a polycarbonate-based resin, a liquid crystal polymer, or a polyetheretherketone-based resin.

10. The layered antenna structure according to claim 1, wherein the dielectric layer is in contact with an entirety of the signal line.

11. The layered antenna structure according to claim 1, wherein the antenna conductor includes an internal line-shaped conductor formed in such a manner as to make a gap inside the antenna conductor.

12. The layered antenna structure according to claim 1, wherein the ground conductor includes a line-shaped ground conductor formed in such a manner as to make a gap.

13. The layered antenna structure according to claim 11, wherein the ground conductor includes a line-shaped ground conductor formed in such a manner as to make a gap, and
at least a portion of the internal line-shaped conductor overlaps with the line-shaped ground conductor in a plan view.

14. A window glass for vehicle comprising:
the layered antenna structure according to claim 1.

* * * * *